United States Patent [19]

Hamasaki et al.

[11] Patent Number: 5,425,114
[45] Date of Patent: Jun. 13, 1995

[54] NOISE REDUCTION APPARATUS

[75] Inventors: Takeshi Hamasaki, Yao; Yukiko Yashita, Osaka, both of Japan

[73] Assignee: Matsushita Electric Industrial Co., Ltd., Osaka, Japan

[21] Appl. No.: 79,384

[22] Filed: Jun. 21, 1993

[30] Foreign Application Priority Data

Jun. 25, 1992 [JP] Japan .................. 4-167183

[51] Int. Cl.⁶ .................. G06K 9/40; H04N 5/21
[52] U.S. Cl. .................. 382/254; 382/199; 382/281; 348/618; 348/620; 348/622
[58] Field of Search .............. 382/54, 22, 43, 48; 348/618, 619, 620, 621, 622, 627

[56] References Cited

U.S. PATENT DOCUMENTS

| | | | |
|---|---|---|---|
| 4,242,705 | 12/1980 | Ebihara | 348/620 |
| 4,860,104 | 8/1989 | Katsuyama | 348/620 |
| 4,901,150 | 2/1990 | Klingelhofer et al. | 348/618 |
| 5,247,354 | 9/1993 | Nakajima | 348/621 |

FOREIGN PATENT DOCUMENTS

0504428A1 9/1992 European Pat. Off. ........ H04N 5/21

OTHER PUBLICATIONS

Patent Abstracts of Japan, vol. 16, No. 150 (E-1189) 14 Apr. 1992 & JP-A-04 004 676 (Matsushita Electric Industrial Co., Ltd.) 9 Jan. 1992.

Primary Examiner—David K. Moore
Assistant Examiner—Phuoc Tran
Attorney, Agent, or Firm—Stevens, Davis, Miller & Mosher

[57] ABSTRACT

A field recursive type noise reduction apparatus is disclosed in which the field difference is divided into a plurality of frequency components by means of the Hadamard transformation and the existence of a boundary of an oblique line in the proximity of pixels to be processed is detected from frequency components remaining by removing minimum and maximum horizontal frequency components by an oblique line detection circuit. In the location where the existence of the boundary of oblique line is detected, a feedback rate of the apparatus is reduced to avoid deterioration of the image quality by nonlinear processing means and in other locations the feedback rate is increased to improve the S/N, so that a noise reduction apparatus is realized having excellent improvement of the S/N as compared with a conventional field recursive type noise reduction apparatus.

12 Claims, 18 Drawing Sheets

FIG. 4

NOISE REDUCTION APPARATUS

BACKGROUND OF THE INVENTION

1. Field of the Invention

The present invention relates to a noise reduction apparatus for reducing noise without deterioration of an original image, such as afterimage, even in a moving image by utilizing the video output frame or the field correlation in a television, a video, a video camera or the like, and more particularly to such an apparatus utilizing field correlation.

2. Description of the Related Art

A conventional noise reduction apparatus is disclosed in, for example, U.S. Pat. No. 4,860,104. Conventional noise reduction apparatuses are now described.

A difference between an input video signal and a one-frame delayed video signal thereof is calculated. This difference is named a frame difference. When the input video signal represents a static image, the frame difference is all noise and accordingly the noise can be reduced by subtracting the frame difference from the input video signal.

However, when the input video signal represents a moving image, the frame difference is a mixed signal of a video signal having no frame correlation and noise. In this case, subtraction of the frame difference from the input video signal causes deterioration of the image quality, such as afterimage. Accordingly, it is necessary to extract only noise contained in the frame difference.

Generally, a method has been widely used in which a proper threshold value is provided and data having an amplitude smaller than the threshold value is extracted as noise from the frame difference data on the basis of the statistical fact that the amplitude of noise is small as compared with that of the video signal. However, this method causes misunderstanding for noise having a large amplitude and signals having a small amplitude.

Thus, there has been introduced an idea utilizing a difference in a frequency distribution between the video signal and noise to extract noise on the basis of not only the amplitude but also the frequency. More particularly, since the video signal and noise are mainly distributed in a low frequency area and a high frequency area, respectively, the video signal and noise are mainly contained in a low frequency component and a high frequency component of the frame difference, respectively, when the frame difference is decomposed into a plurality of frequency components, so that misunderstanding in extraction of noise is reduced.

The aforementioned prior art utilizes the above idea and data having small amplitude in two divided frequency components is extracted and combined as noise. In this case, the threshold value for the low frequency component is made small to extract only data having a very small amplitude as noise and the threshold value for the high frequency component is made larger than that of the low frequency component to extract data having an amplitude which is large to some extent as noise to thereby increase the accuracy in extraction of noise. Consequently, deterioration by afterimages can be reduced to improve the noise reduction effect.

As the frequency decomposition method, a spatial LPF (Low Pass Filter) or HPF (High Pass Filter) or orthogonal transformation such as the Hadamard transformation is utilized. The frame difference is considered as data for one picture and a plurality of data existing in positions indicated by $x_{00}$ to $x_{03}$ of FIG. 16, for example, are selected onto the difference data. Operation using the plurality of data is made to calculate spatial frequency components.

By subtracting noise extracted from the spatial frequency components from the input video signal, non-correlation components between the frames are subtracted to obtain the output video signal having reduced noise and supplied to a frame memory.

The noise reduction apparatus using such a method replaces the frame memory by a field memory in order to reduce an amount of circuits and thus causes a problem when the field correlation is utilized. More particularly, it results in deterioration in a boundary of oblique line. Its reason is that the frame difference and the field difference are different basically. This is described with reference to FIG. 17.

FIG. 17 illustrates an area required to obtain difference data of $x_{00}$ to $x_{03}$. shown in FIG. 16 on a boundary of oblique line when the boundary of oblique line exists in the input video signal. An area indicated by a of FIG. 17 may be defined to obtain the frame difference and an area indicated by b of FIG. 17 may be defined to obtain the field difference. In FIG. 17, first and second fields are two fields constituting the frame.

As shown in FIG. 17, the frame difference contains only noise by cancellation of the video signal while the field difference contains noise and signals. In the field difference, portions in which a dot pattern is depicted represent data containing signals. The case where such locations are subjected to the field recursive type noise reduction process is considered. Since this process is equivalent to the process in which an average of several continuous fields is obtained, the process of reducing a difference of a signal value between two fields is performed in locations in which signal values are different between the two fields. Accordingly, it results in edges being collapsed.

Further, when scanning lines to be processed are considered in relation to the scanning line numbers within one frame, a combination of two scanning lines to be averaged is fixed to be the first scanning line and the 264-th scanning line, the second scanning line and the 265-th scanning line, . . . Accordingly, when a location of a vertical edge is between the scanning lines to be combined, the collapse of edge occurs and otherwise it does not occur. This is illustrated in FIG. 18.

FIG. 18A illustrates the case where the averaging process is performed for scanning lines a1 to a3 of the odd field and scanning lines b1 to b3 of the even field in the boundary of oblique line constituted by the brightness signals for the white level and the black level. The combinations to be averaged are (a1, b1), (a2, b2) and (a3, b3). It is considered that a portion having no correlation in the vertical direction in a1 and b1, that is, a portion in which a1 is white level and b1 is black level becomes a gray level by means of the averaging process. The same phenomenon occurs for the combinations of a2 and b2, and a3 and b3, and the boundary of oblique line becomes as shown in FIG. 18B. Further, as apparent from FIGS. 18A and 18B, locations in which the vertical edge is collapsed and locations in which the vertical edge is not collapsed alternately present themselves. In such a situation, the collapsed edge is difficult to be viewed and disappears visually. Accordingly, one frame seems to be composed of only the odd field or the even field in the boundary of oblique line and the oblique line is unsightly.

Because of the above reason, in the conventional field recursive type noise reduction apparatus, if the boundary of oblique line exists in the input image, the image quality in the boundary of oblique line is deteriorated when improvement for the S/N is attempted. Accordingly, improvement of the S/N in other locations can not be performed and the total improvement of the S/N can not be also attained greatly.

SUMMARY OF THE INVENTION

It is an object of the present invention to solve the problems in the prior art and to provide a noise reduction apparatus in which deterioration in an oblique line portion is reduced and noise reduction effect in other portions is increased even in a field recursive type noise reduction apparatus and which is advantageous in terms of an amount of circuits.

In order to achieve the object, a first noise reduction apparatus of the present invention comprises first subtraction means for calculating a difference of an input signal and an output signal of delay means, feature extraction means for decomposing an output of the first subtraction means into a plurality of feature components, pattern detection means supplied with at least one of the feature components for detecting a predetermined pattern, nonlinear processing means for performing nonlinear process to the output of the first subtraction means, second subtraction means for calculating a difference of an output of the nonlinear processing means and the input video signal, and the delay means for delaying an output signal of the second subtraction means, an output gain of the nonlinear processing means being varied in accordance with an output of the pattern detection means.

A second noise reduction apparatus of the present invention comprises first subtraction means for calculating a difference of an input signal and an output signal of delay means, feature extraction means for decomposing an output of the first subtraction circuit into a plurality of feature components, pattern detection means supplied with at least one of the feature components for detecting a predetermined pattern, nonlinear processing means for performing nonlinear processing on at least one of the outputs of the feature extraction means, inverse transformation means for performing inverse transformation by using an output of the nonlinear processing means and remaining components of the feature extraction components which are not supplied to the nonlinear processing means, second subtraction means for calculating a difference signal of an output of the inverse transformation means and the input video signal, and delay means for delaying an output signal of the second subtraction means, an output gain of the nonlinear processing means being varied in accordance with an output of the pattern detection means.

With the above configuration, according to the present invention, the output of the feature extraction means is utilized to judge whether the boundary of oblique line is contained in a feature extraction area or not and the noise reduction apparatus having reduced deterioration of oblique line can be obtained by changing the nonlinear processing characteristic in accordance with a result of the judgment.

BRIEF DESCRIPTION OF THE DRAWINGS

FIG. 4 schematically illustrates transformation patterns of the Hadamard transformation in the first embodiment of the present invention;

DESCRIPTION OF THE PREFERRED EMBODIMENTS

Embodiments of the present invention are now described with reference to the accompanying drawings.

Figure 1:
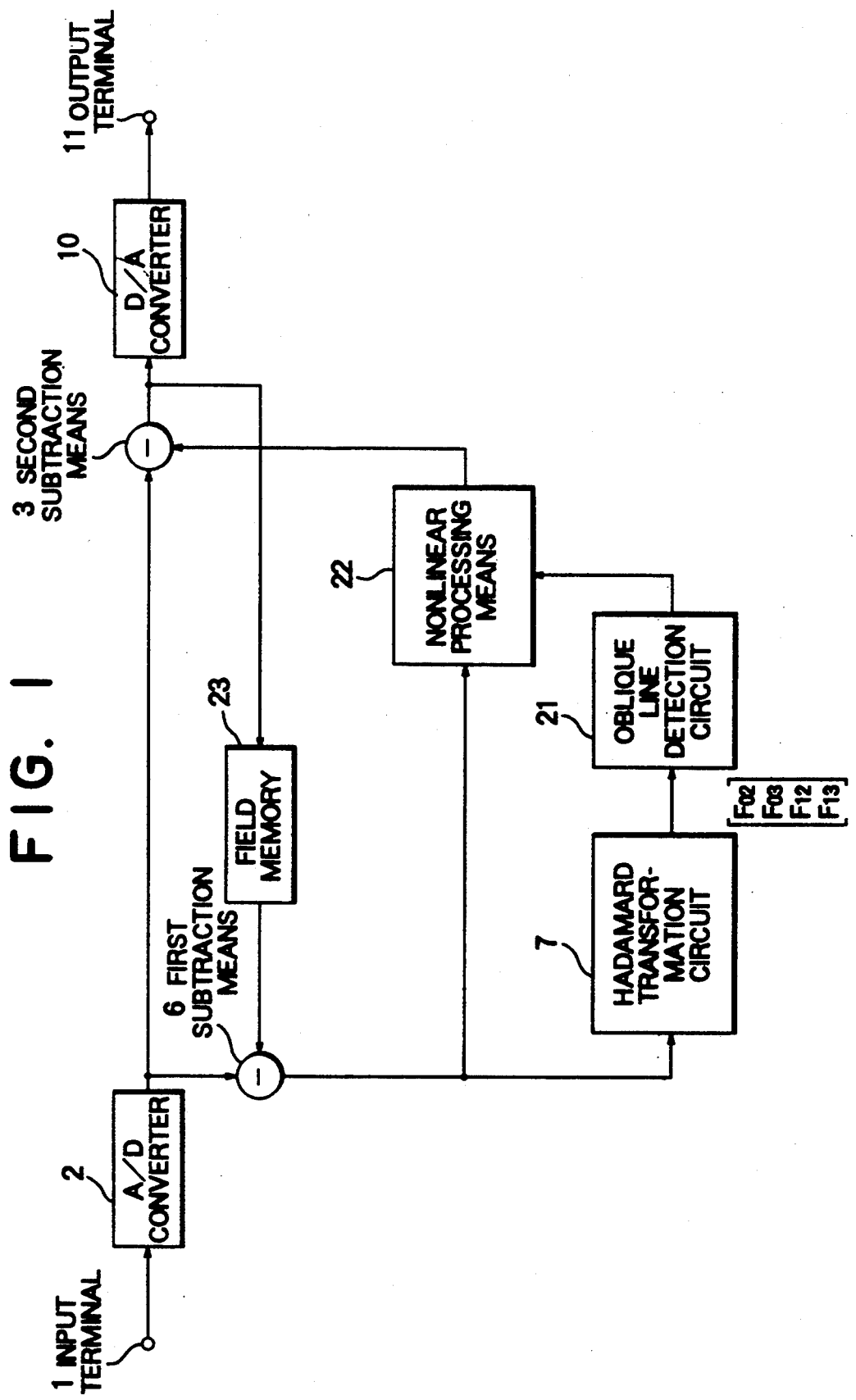
FIG. 1 is a block diagram schematically illustrating a noise reduction apparatus according to a first embodiment of the present invention.

FIG. 1 is a block diagram of a noise reduction apparatus according to a first embodiment of the present invention. In FIG. 1, numeral 1 denotes an input terminal, 2 an A/D converter, 6 first subtraction means, 7 an Hadamard transformation circuit, 21 an oblique line detection circuit, 22 nonlinear processing means, 3 second subtraction means, 23 a field memory, 10 a D/A converter and 11 an output terminal.

An analog video signal supplied from the input terminal 1 is converted into a digital video signal in the A/D converter 2 and the digital video output signal is supplied to the first and second subtraction means 6 and 3, respectively. The first subtraction means 6 calculates a difference of the input video signal and a delayed video signal which corresponds to an output signal of the second subtraction means 3 delayed by one field. An output of the first subtraction means 6 is supplied to the Hadamard transformation circuit 7 and the nonlinear processing means 22. The nonlinear processing means 22 performs a process as shown in FIG. 12A, for example, to an input signal thereof.

Figure 12A:
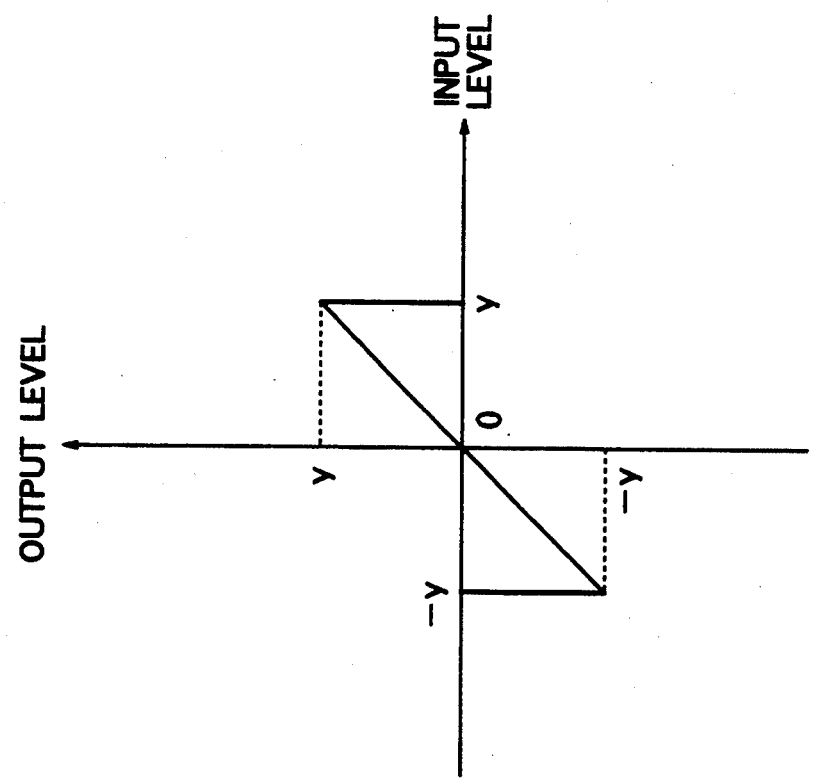
FIGS. 12A and 12B are characteristic diagrams showing input/output characteristics of nonlinear processing circuits in the first and second embodiments.

FIG. 12A illustrates the process that when an amplitude of the input is smaller than a threshold "x" the input is outputted as it is and when the input is larger than the threshold "x" a fixed value "x" is outputted.

On the other hand, the field difference supplied to the Hadamard transformation circuit 7 is subjected to the 2×4 order Hadamard transformation to be divided into eight two-dimensional frequency components such as a low-frequency component, a vertical high-frequency component, a horizontal high-frequency component and the like.

Figure 16:
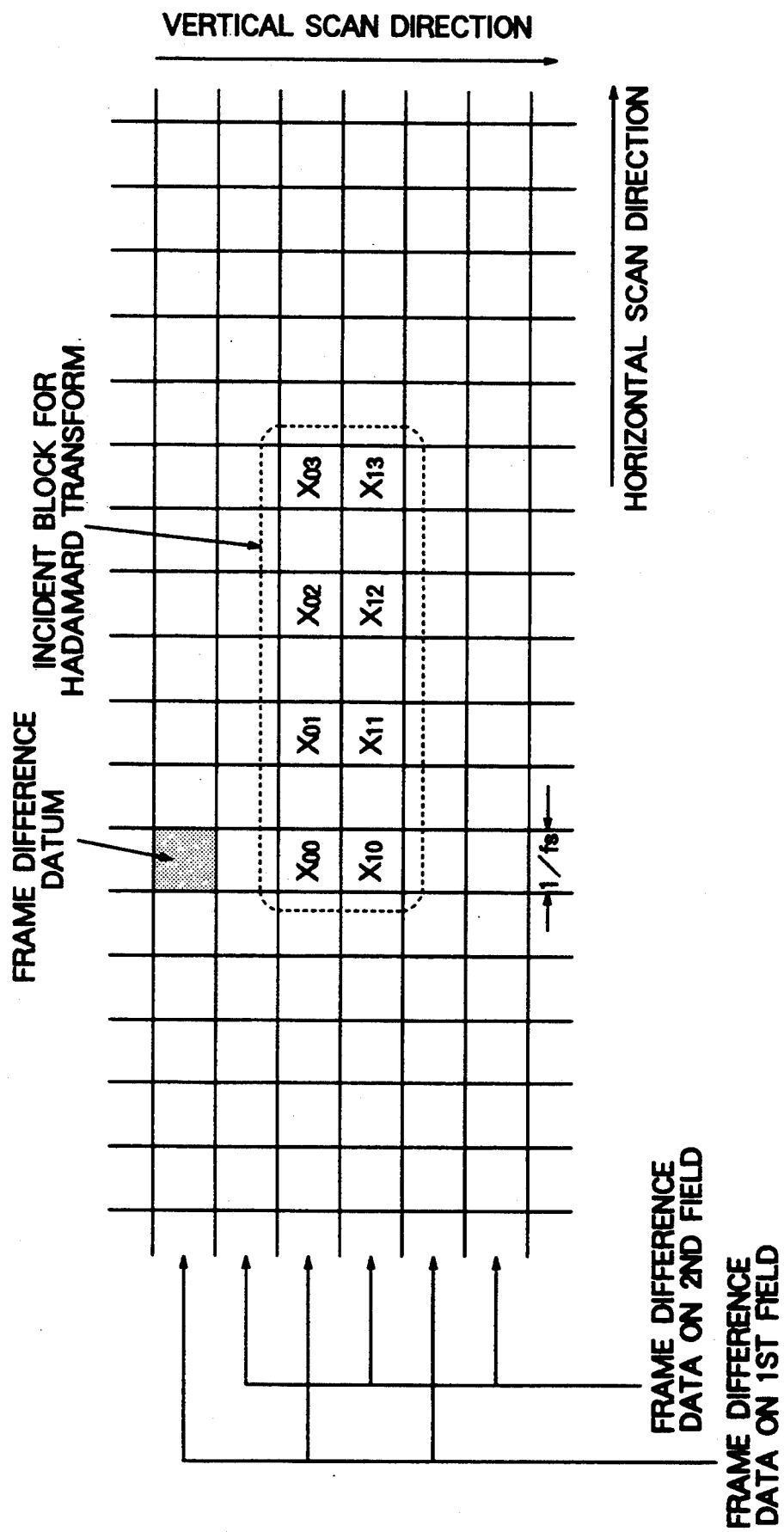
FIG. 16 schematically illustrates selection of difference data for calculation of a spatial frequency.
Figure 17:
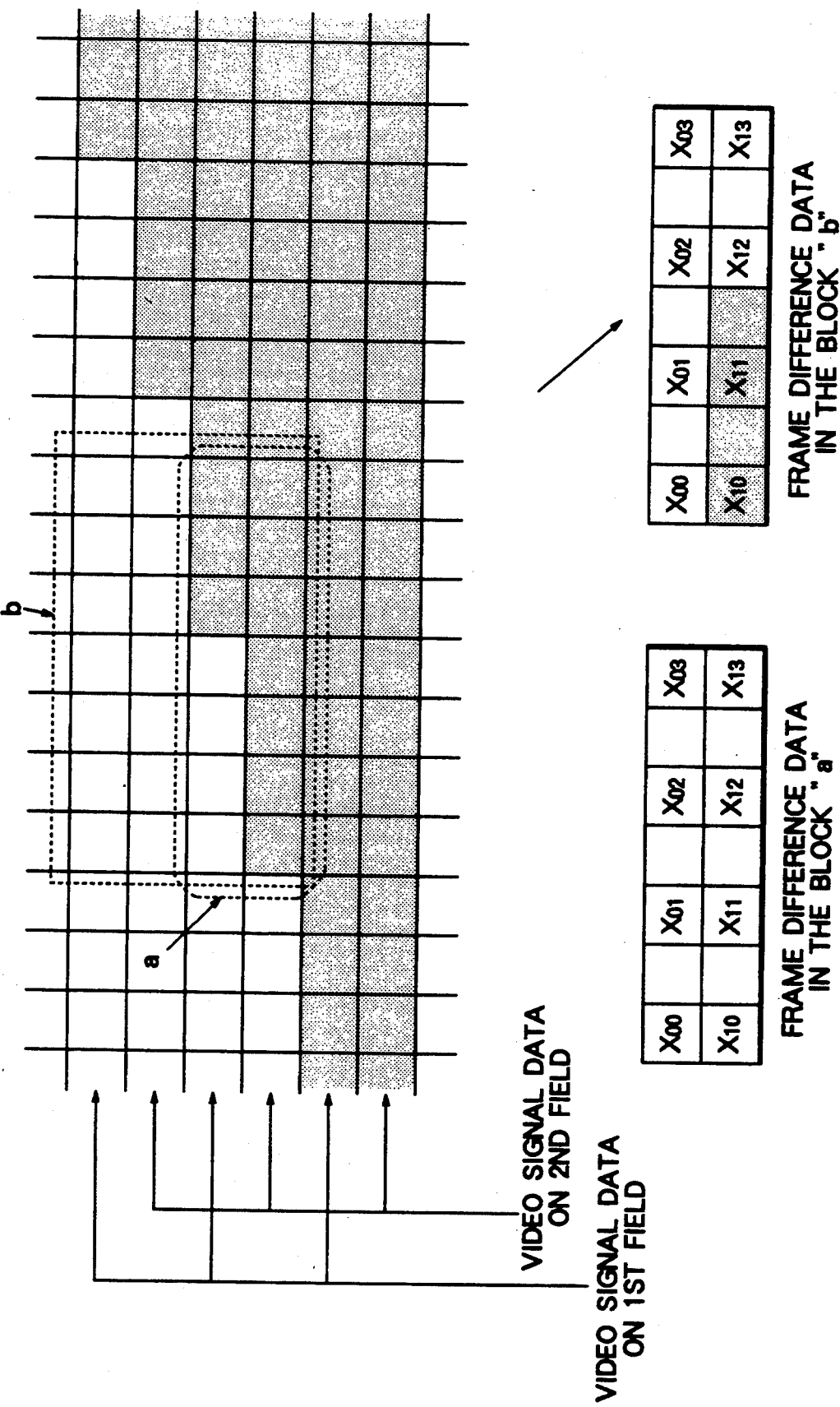
FIG. 17 schematically illustrates the oblique line image, the frame difference and the field difference.
Figure 18:
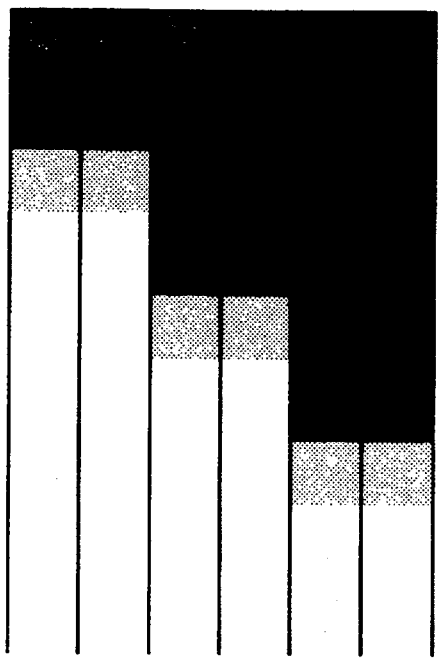
FIGS. 18A and 18B schematically illustrate deterioration of the boundary of oblique line in the prior art.
Figure 18:
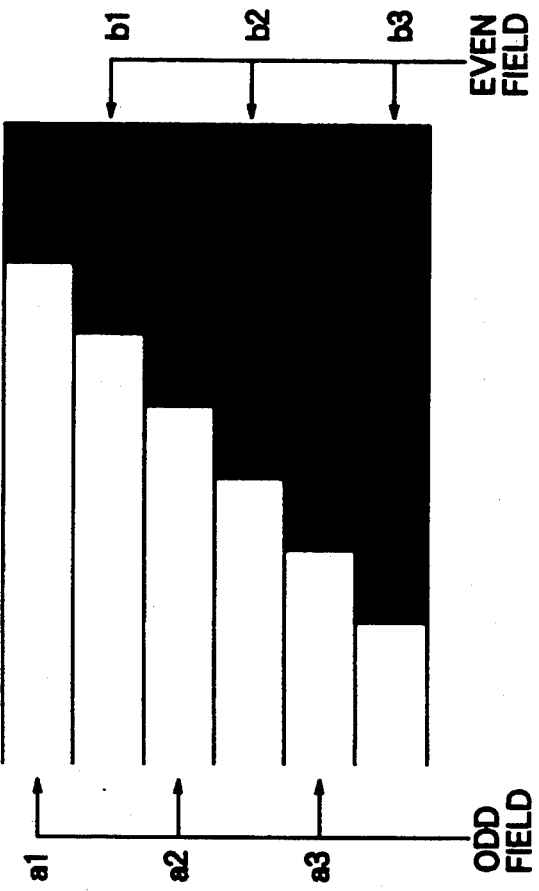

An input block $X_{24}$ is assumed as shown in FIG. 16 and to be expressed by $$X_{24} = \begin{bmatrix} X_{00} & X_{01} & X_{02} & X_{03} \\ X_{10} & X_{11} & X_{12} & X_{13} \end{bmatrix}$$

When a transformation output of the 2×4 order Hadamard transformation is $F_{24}$ and is assumed as follows:

$$F_{24} = \begin{bmatrix} F_{00} & F_{01} & F_{02} & F_{03} \\ F_{10} & F_{11} & F_{12} & F_{13} \end{bmatrix}$$

the output $F_{24}$ of the Hadamard transformation is obtained from the input data $X_{24}$ of 2×4 order by performing the following operation:

$$F_{24} = H_2 \cdot X_{24} \cdot H_4$$

where $H_2$ and $H_4$ are given by $$H_2 = \begin{bmatrix} +1 & +1 \\ +1 & -1 \end{bmatrix}$$

$$H_4 = \begin{bmatrix} +1 & +1 & +1 & +1 \\ +1 & -1 & +1 & -1 \\ +1 & +1 & -1 & -1 \\ +1 & -1 & -1 & +1 \end{bmatrix}$$

Components $F_{02}$, $F_{03}$, $F_{12}$ and $F_{13}$ among the eight components $F_{00}$ to $F_{13}$ are supplied to the oblique line detection circuit 21 and the oblique line detection circuit 21 judges whether the oblique line is contained in the input block of the Hadamard transformation circuit 7 on the basis of the four components or not. Operation of the oblique line detection circuit 21 will be described in detail later.

The oblique line detection circuit 21 produces a detection signal when the circuit detects the oblique line. When the oblique line detection circuit 21 produces the detection signal, the nonlinear processing means 22 reduce to small value a maximum value (the value "x" of FIG. 12A) of an output signal as compared with a normally set value.

The output of the nonlinear processing means 22 is a small amplitude portion taken out from the field difference as noise. An amplitude of noise capable of being taken out is increased as the maximum value of the output is set larger, and accordingly the S/N is improved. However, as described in relation to the prior art, since averaging of two fields in the location where the boundary of the oblique line exists deteriorates the image quality, it is necessary to avoid the averaging by reducing the maximum value of the output of the nonlinear processing means 22 to some extent. Accordingly, only when the boundary of the oblique line is detected, the maximum value is set small.

The output of the nonlinear processing means 22 is supplied to the subtraction circuit 3 to thereby subtract noise from the input signal so that a digital video signal having reduced noise is obtained. The digital video signal is converted in the D/A converter 10 to the original analog video signal which is outputted.

As described above, the location where the oblique line exists is detected and the maximum value of the output of the nonlinear processing means 22 in the location is reduced to some extent to reduce the feedback rate of the system, so that deterioration of the image quality of the output video signal can be suppressed. Further, since the maximum value of the output of the nonlinear processing means 22 can be set to be large in the location other than the oblique line, the S/N can be improved.

Figure 3:
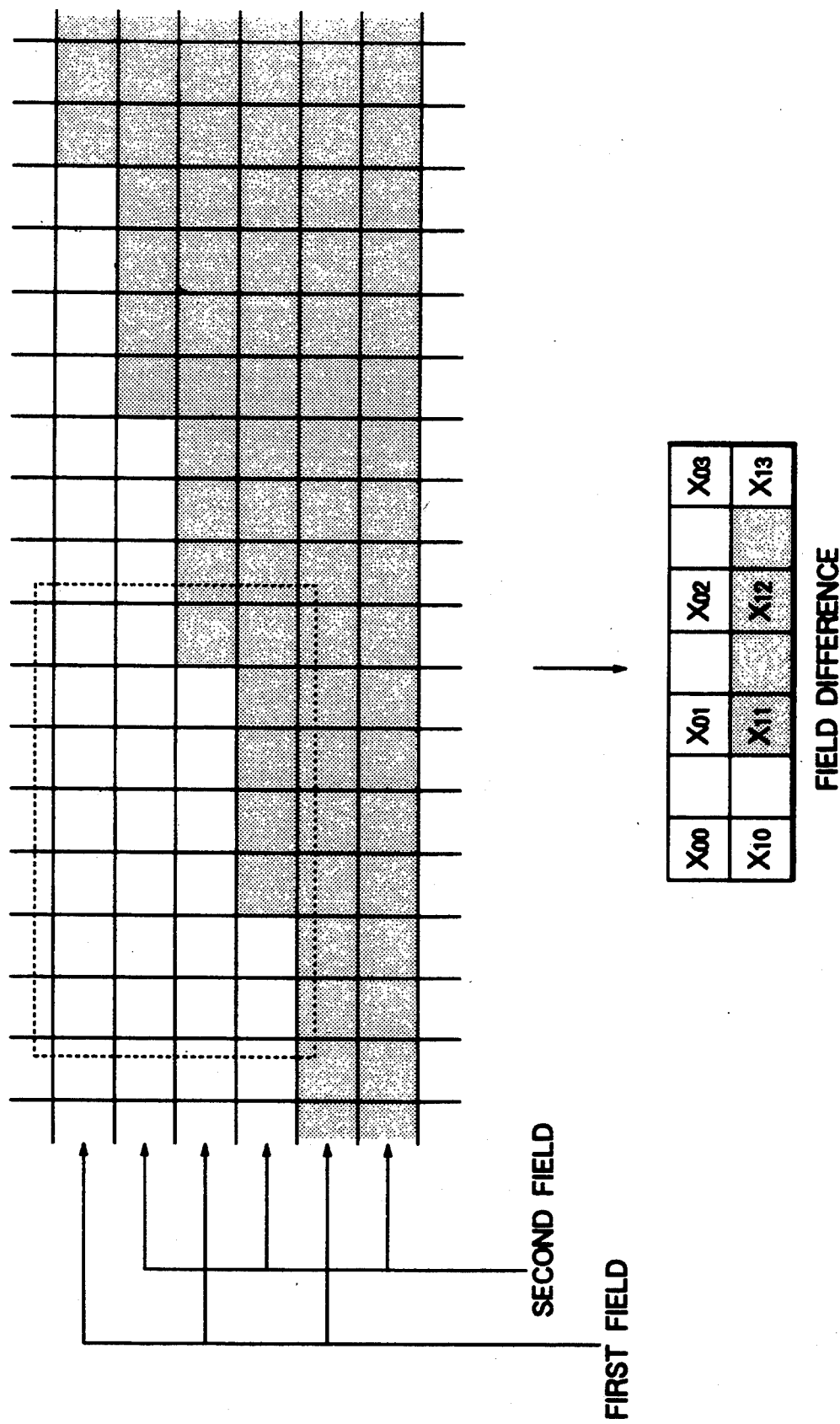
FIG. 3 schematically illustrates a relation of an oblique line image and the field difference thereof in the first embodiment of the present invention.

The principle and operation of the oblique line detection circuit 21 are now described in detail. The upper portion of FIG. 3 illustrates a positional relation of an enlarged boundary of an oblique line depicted on the lower left portion to the upper right portion of the picture and an input block (broken line) of the Hadamard transformation circuit. The lower portion of FIG. 3 illustrates a distribution of the field differences in the input block. The field difference data is supplied to the input block every other data as shown in FIG. 16. The field difference is obtained by subtracting the second field from the first field. In the white portion of the field difference, the video signal is substantially canceled and only noise is obtained. In the hatched portion of the field difference, noise and the difference of the video signals in the boundary of oblique line are obtained. In the actual picture, deterioration of an oblique line having an inclination as shown in FIG. 3 is most remarkable and accordingly description is made of an oblique line having inclination as shown in FIG. 3.

Data to be processed currently is assumed to be data in the location expressed by $x_{11}$. Deterioration of the oblique line is caused by feeding back the video signal contained in the field difference in the location where the boundary of oblique line exists as described above. Accordingly, it is considered that deterioration of the boundary of oblique line can be prevented by reducing to a small value outputs value of the nonlinear processing means 22 to reduce the feedback amount when a hatched portion comes in the location expressed by $x_{11}$. FIG. 3 illustrates such an actual example.

Figure 4:
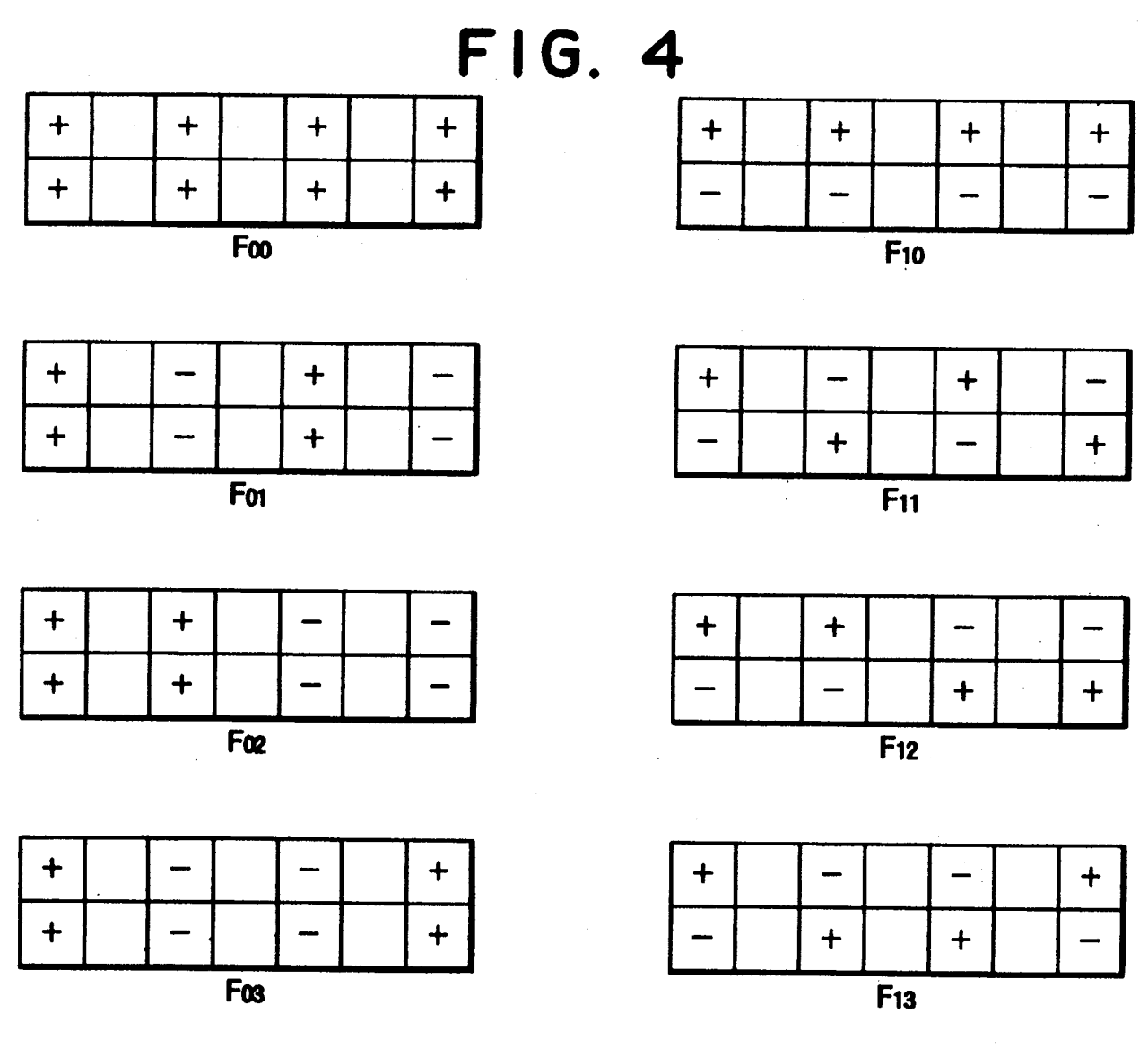

The field difference of FIG. 3 is Hadamard-transformed by eight block patterns shown in FIG. 4 to obtain eight transformation components. FIG. 4 is a schematic diagram showing a relation of the input block and the transformation equation. Marks of "+" and "−" shown in FIG. 4 represent "+1" and "−1", respectively, and the blank represents "0". These represent coefficients to be multiplied by data existing in the respective positions in the input block upon transformation. For example, $F_{00}$ is given by $$F_{00} = x_{00} + x_{01} + x_{02} + x_{03} + x_{10} + x_{11} + x_{12} + x_{13}$$

Accordingly, all coefficients are "+1". Further, $F_{01}$ is given by $$F_{01} = x_{00} - x_{01} + x_{02} - x_{03} + x_{10} - x_{11} + X_{12} - x_{13}$$

Accordingly, coefficients in positions of $x_{01}$, $x_{03}$, $x_{11}$ and $x_{13}$ are "−1".

Since it is considered that the amplitude of the difference of the video signal contained in the input block is larger than that of noise generally, the difference of the video signal is dominant in the operation using data in the input block. In obtaining $F_{00}$ from the data shown in FIG. 3, for example, the differences of the video signals appearing in two positions indicated by $x_{11}$ and $x_{12}$ are added and are increased to about twice. A value of $F_{00}$ may be considered about twice as large as the difference of the video signal. However, in $F_{01}$, the differences of the video signals in two positions cancel each other and almost only noise is taken out from $F_{01}$. In this manner, components from which large values are obtained are $F_{00}$, $F_{03}$, $F_{10}$ and $F_{13}$.

In comparison of $F_{00}$ and $F_{10}$, signs of coefficients in positions ($X_{11}$ and $x_{12}$) in which the difference of the video signals is contained are opposite and the difference of the video signals is dominant in the operation using data in the input block as described above. Accordingly, it is considered that signs of $F_{00}$ and $F_{10}$ are opposite. Similarly, it is considered that $F_{03}$ and $F_{13}$ have a relation of different signs.

Figure 5:
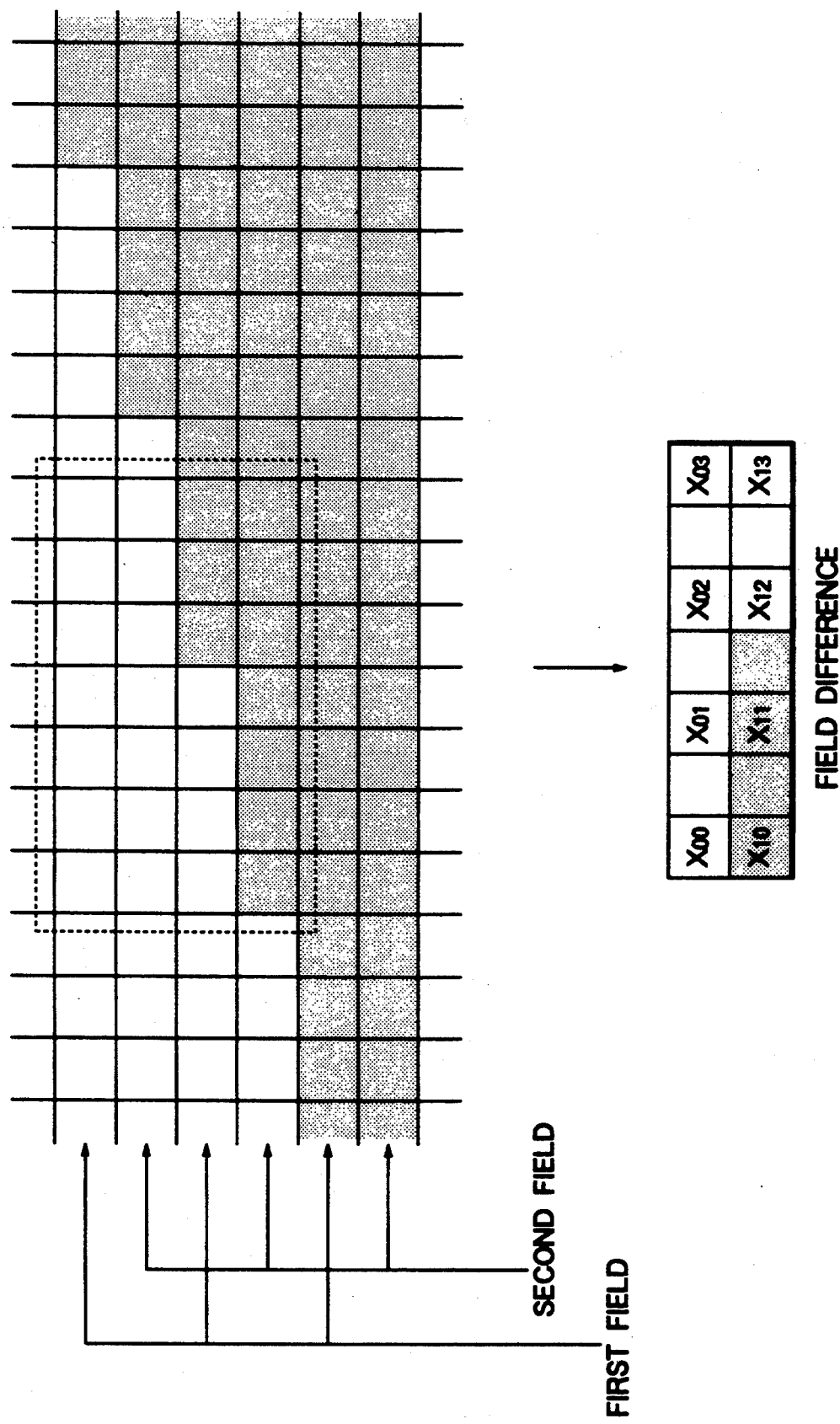
FIG. 5 schematically illustrates a relation of an oblique line image and the field difference thereof in the first embodiment of the present invention.

FIG. 5 illustrates an input pattern obtained by moving the input pattern of FIG. 3 by two data blocks to the right and this is a case where the oblique line detection process is required in the same manner as in FIG. 3. The hatched portion of the field difference signal contains the difference of the video signals. When the field difference signal is Hadamard-transformed by the block patterns of FIG. 4, it is considered that values of $F_{00}$, $F_{02}$, $F_{10}$ and $F_{12}$ are increased, and $F_{00}$ and $F_{10}$, and $F_{02}$ and $F_{12}$ have a relation of different sign from each other.

Figure 6:
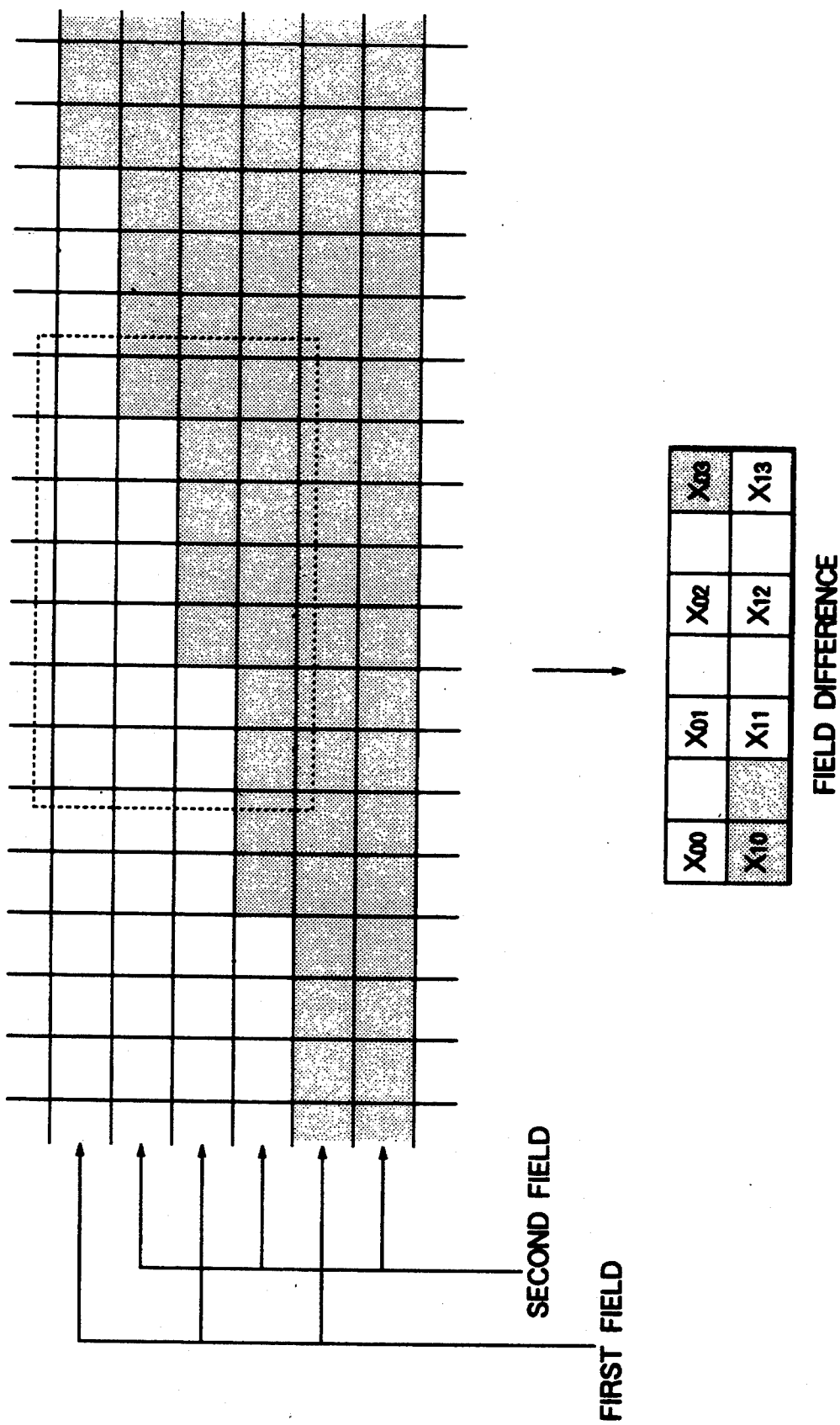
FIG. 6 schematically illustrates a relation of an oblique line image and the field difference thereof in the first embodiment of the present invention.

FIG. 6 illustrates an input pattern obtained by moving the input pattern of FIG. 5 by two data blocks to the right. The Hadamard transformation components have increased absolute values of $F_{00}$, $F_{03}$, $F_{11}$ and $F_{12}$. However, in this case, the location shown by $x_{11}$ is not hatched (the video signal is not almost contained) and deterioration of the oblique line is not influenced even if feedback is made. Accordingly, in this case, detection of the oblique line is not made and this input pattern is excepted from objects to be detected in order to improve the S/N by increasing the feedback amount.

Figure 7:
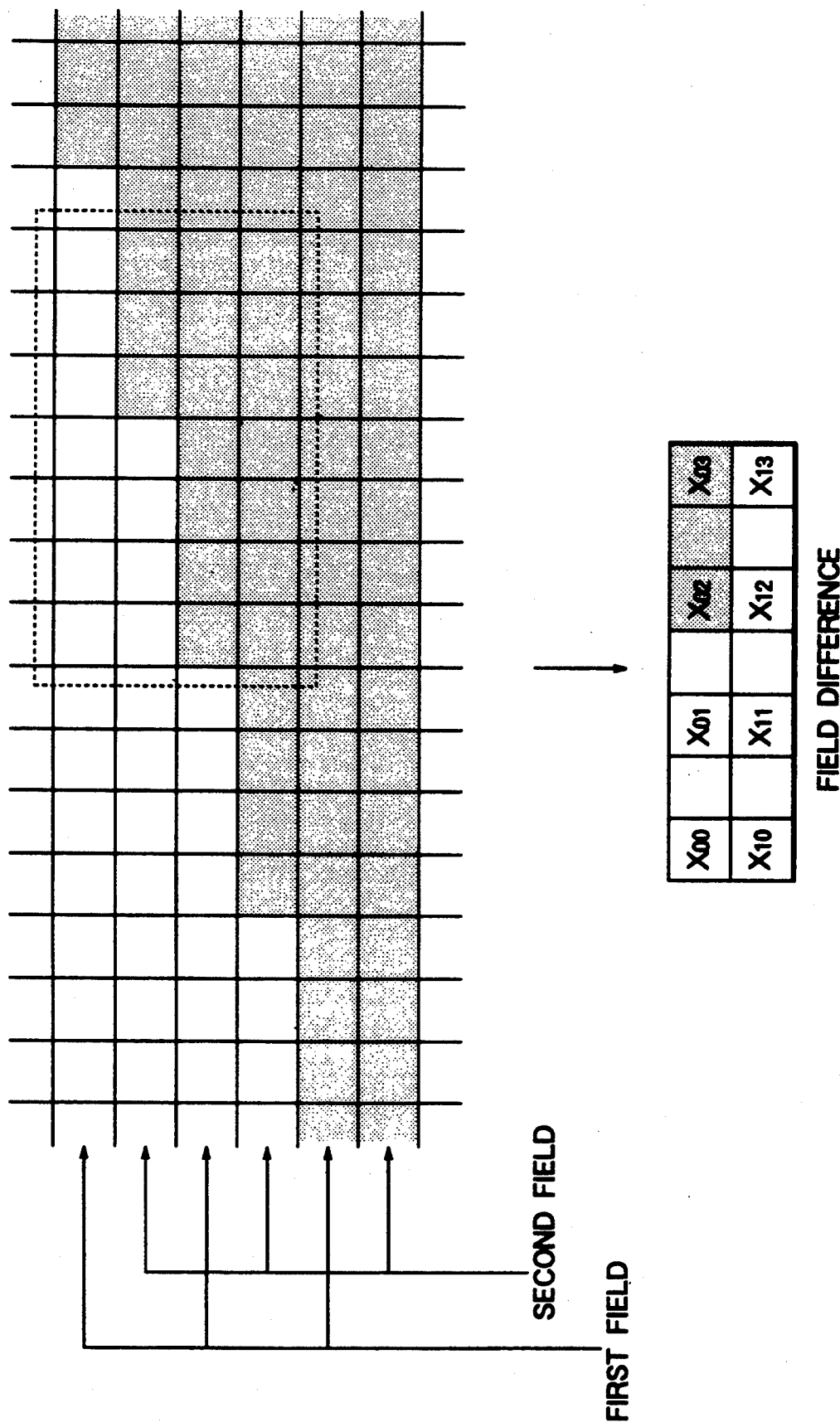
FIG. 7 schematically illustrates a relation of an oblique line image and the field difference thereof in the first embodiment of the present invention.
Figure 8:
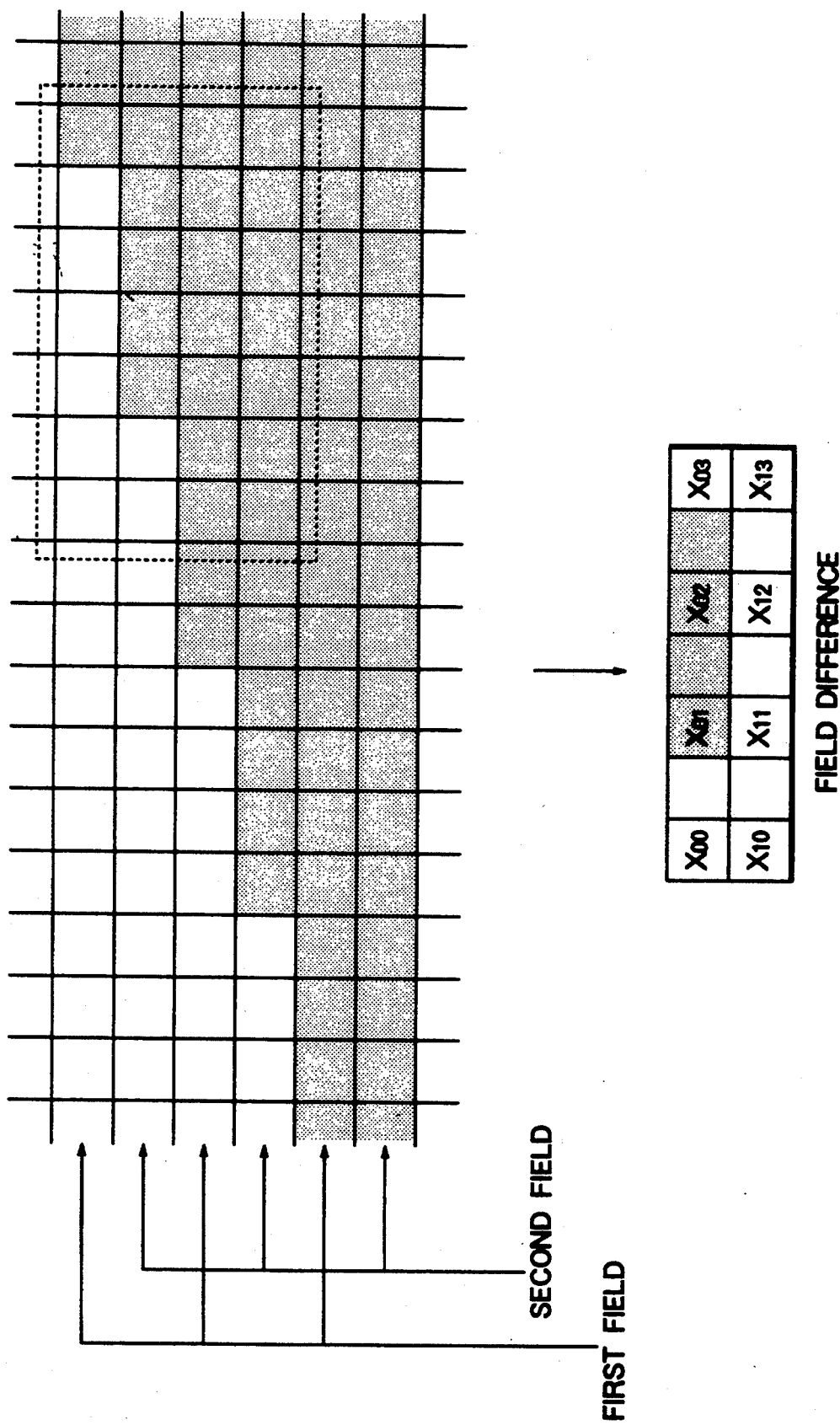
FIG. 8 schematically illustrates a relation of an oblique line image and the field difference thereof in the first embodiment of the present invention.

Similarly, FIG. 7 illustrates an input pattern obtained by moving the input pattern of FIG. 6 by two data blocks to the right and FIG. 8 also illustrates an input pattern obtained by moving the input pattern of FIG. 7 by two data blocks to the right. In the case of FIG. 7, absolute values of $F_{00}$, $F_{02}$, $F_{10}$ and $F_{12}$ are increased, and $F_{00}$ and $F_{10}$, and $F_{02}$ and $F_{12}$ have a relation of the same sign. In the case of FIG. 8, absolute values of $F_{00}$, $F_{03}$, $F_{10}$ and $F_{13}$ are increased, and $F_{00}$ and $F_{10}$, and $F_{03}$ and $F_{13}$ have a relation of the same sign. Similarly, in these cases, the location shown by $x_{11}$ is not hatched and deterioration of the oblique line is not influenced even if feedback is made. Accordingly, in these cases, detection of the oblique line is not made and the input pattern is excepted from objects to be detected in order to improve the S/N by increasing the feedback amount.

In brief, in only the case as in FIGS. 3 and 5, a large signal level appears in the location shown by $x_{11}$ and feedback thereof causes deterioration of the oblique line. Accordingly, if only such a case is detected to reduce the feedback amount, it is considered that deterioration of the oblique line can be prevented and the large S/N can be attained in all locations except the oblique line. When there are considered conditions for detecting the cases of FIGS. 3 and 5 from the five patterns described above, there are two conditions as follows:

Absolute values of $F_{00}$, $F_{02}$, $F_{10}$ and $F_{12}$ are increased, and $F_{00}$ and $F_{10}$, and $F_{02}$ and $F_{12}$ have a relation of different signs.

Absolute values of $F_{00}$, $F_{03}$, $F_{10}$ and $F_{13}$ are increased, and $F_{00}$ and $F_{10}$, and $F_{03}$ and $F_{13}$ have a relation of different signs.

A special case is considered hereupon.

Figure 9:
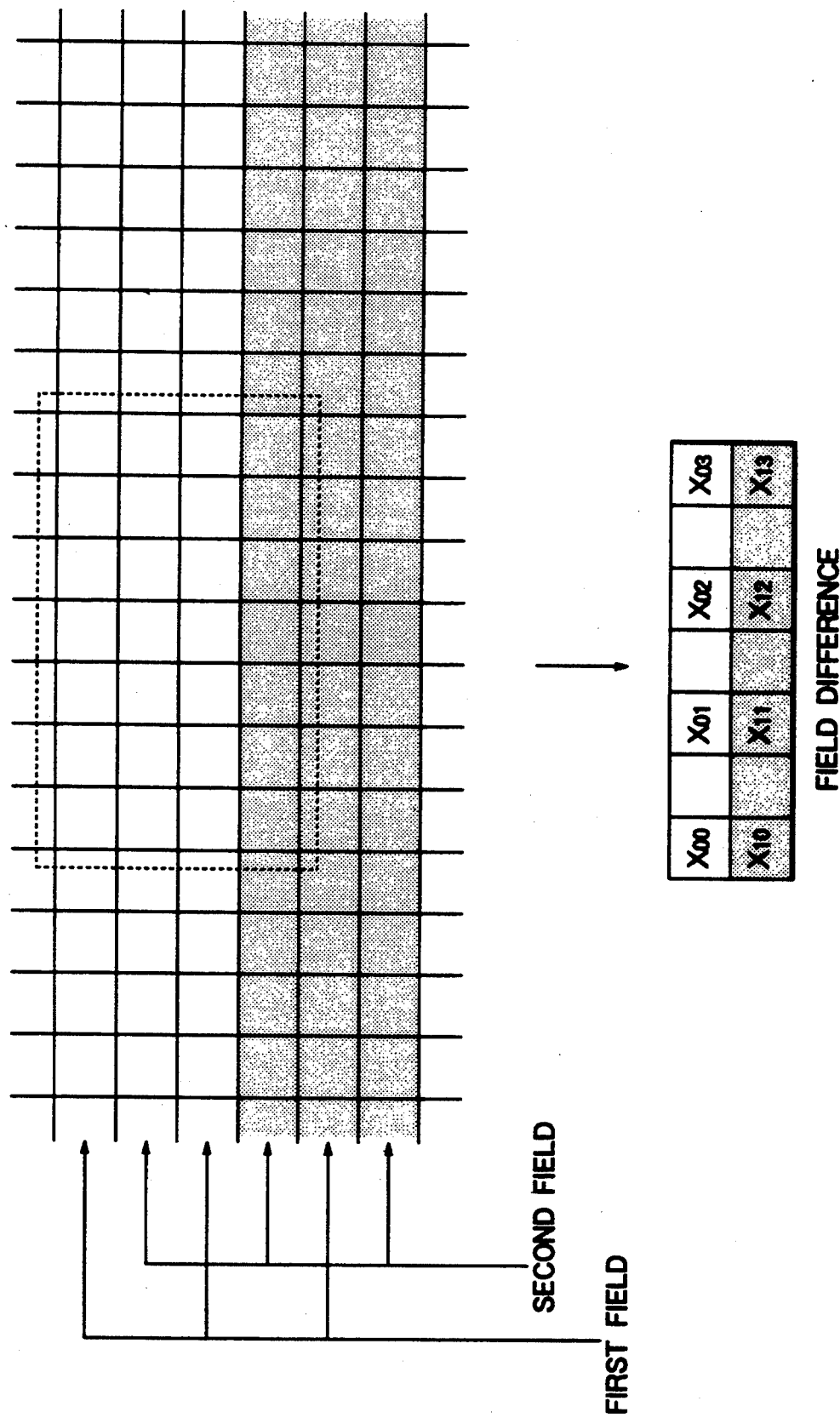
FIG. 9 schematically illustrates a relation of a horizontal line image and the field difference thereof in the first embodiment of the present invention.

FIG. 9 illustrates horizontal lines depicted from the left portion to the right portion of the picture and the field difference, in which only noise is obtained in the blank portion of the field difference and both noise and a difference of the video signals are obtained in the hatched portion. Similarly, when the field difference signal of FIG. 9 is Hadamard-transformed by the eight patterns shown in FIG. 4, the absolute values of $F_{00}$ and $F_{10}$ are increased.

When the oblique line detection circuit is considered collectively, it is necessary to exclude the case where the absolute values of $F_{00}$ and $F_{10}$ are large from the condition upon detection of the oblique line and thus there are two conditions of the oblique line detection as follows:

(1) when the absolute values of $F_{02}$ and $F_{12}$ are large and they have a relation of opposite signs, and
(2) when the absolute values of $F_{03}$ and $F_{13}$ are large and they have a relation of opposite sign.

Figure 2:
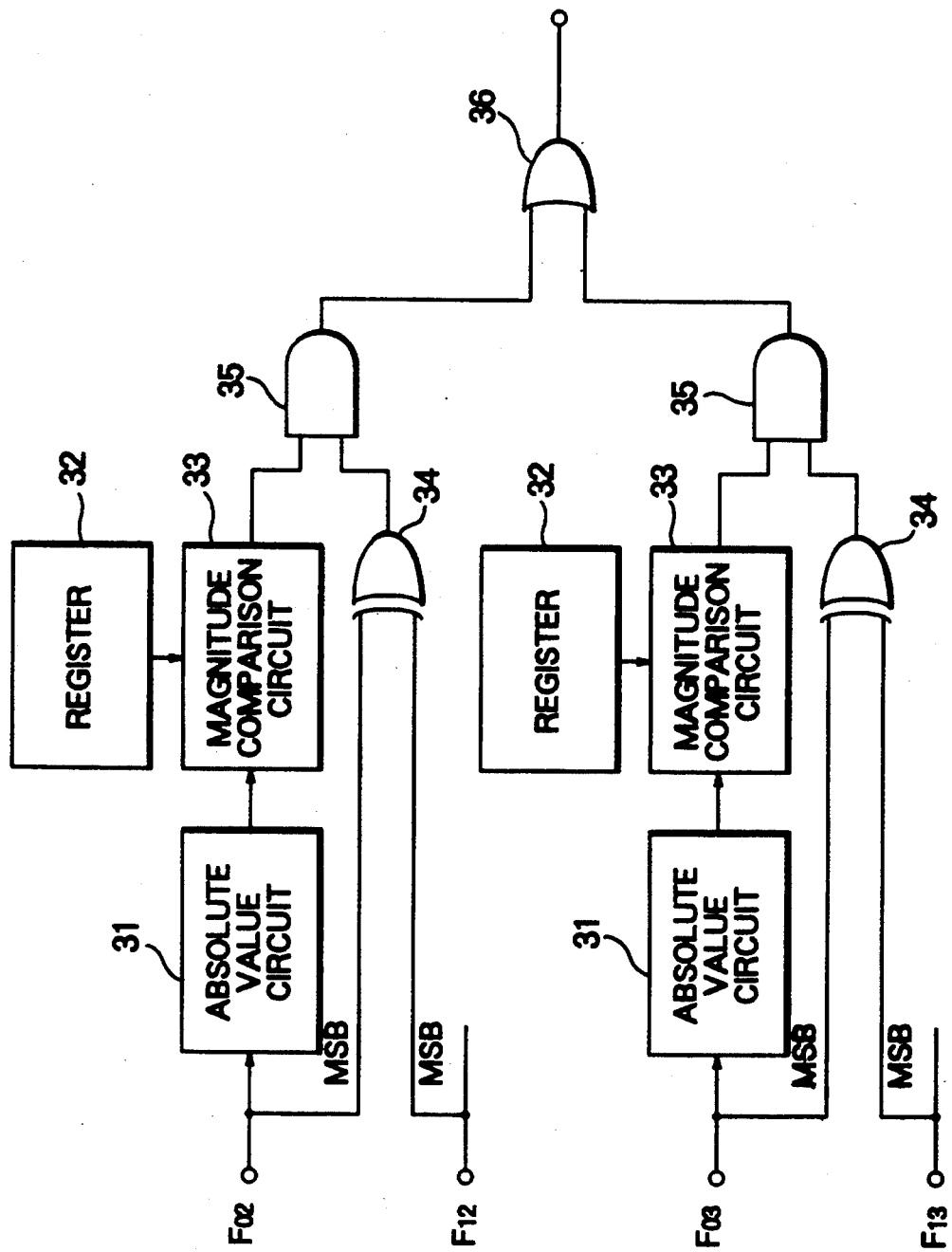
FIG. 2 is a block diagram schematically illustrating an internal configuration of an oblique line detection circuit 21 in the first embodiment of the present invention.

An example of the oblique line detection circuit 21 is now described with reference to FIG. 2. In FIG. 2, numeral 31 denotes an absolute value circuit for obtaining an absolute value of an input signal, 32 a register for holding a numerical value, 33 a magnitude comparison circuit for comparing magnitudes of two input data, and 34, 35 and 36 logic circuits in which 34 is an XOR (exclusive OR) gate, 35 is an AND gate and 36 is an OR gate.

Operation of the oblique line detection circuit configured above is now described.

$F_{02}$ and $F_{03}$ inputted to the oblique line detection circuit are supplied to the absolute value circuits 31 in which absolute values thereof are obtained. An output signal of the absolute value circuit 31 is compared with a threshold value held in the register 32 in the magnitude comparison circuit 33 and only when the output signal of the absolute value circuit 31 is larger than the threshold value, the comparison circuit produces an "H" (high level) output signal. On the other hand, the MSBs (Most Significant Bits) of $F_{02}$ and $F_{12}$ and the MSBs of $F_{03}$ and $F_{13}$ are supplied to the respective XOR gates 34 and only when two input signals are different, each of the XOR gates 34 produces an "H" output signal. The AND gate 35 produces an "H" output signal only when the output signal of the XOR gate 34 and the output signal of the magnitude comparison circuit 33 are both "H". The OR gate 36 produces an "H" output signal when the output signal of at least one of the AND gates 35 is "H". Accordingly, the oblique line detection condition is satisfied when the absolute values of $F_{02}$ and $F_{12}$ are larger than the threshold value and they have a relation of opposite signs, or when the absolute values of $F_{03}$ and $F_{13}$ are larger than the threshold value and they have a relation of opposite signs.

Figure 10:
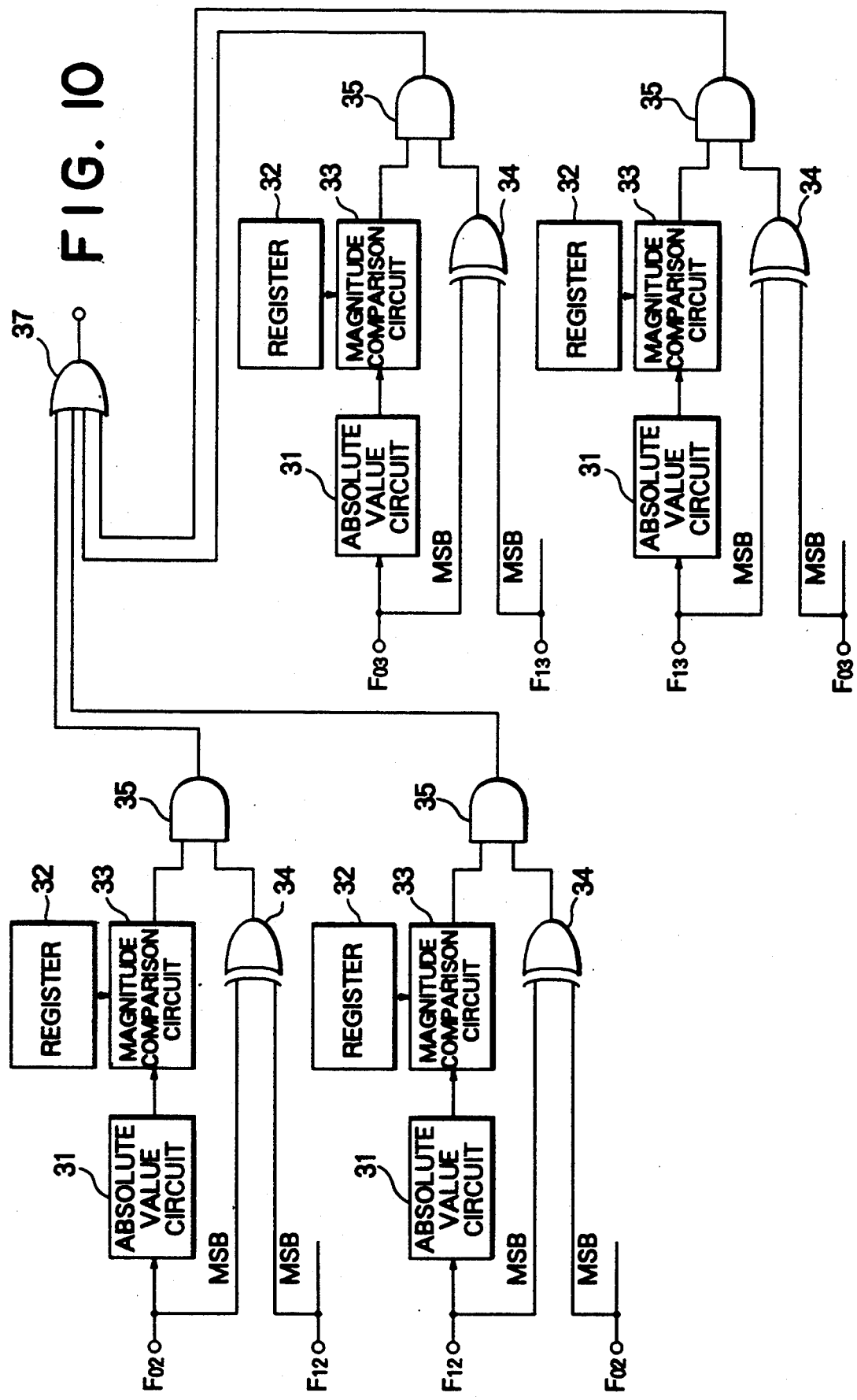
FIG. 10 is a block diagram schematically illustrating an internal configuration of another oblique line detection circuit 21 in the first embodiment of the present invention.

As in the circuit configuration shown in FIG. 10, it is considered that conditions that a value of $F_{12}$ or $F_{13}$ is larger than the threshold value and signs of $F_{02}$ and $F_{12}$ or $F_{03}$ and $F_{13}$ are different are added and a logical sum of four conditions is taken by an OR circuit 37. The hardware scale of this circuit configuration is increased, but the detection accuracy of the oblique line is superior.

A second embodiment of the present invention is now described with reference to the drawings.

Figure 11:
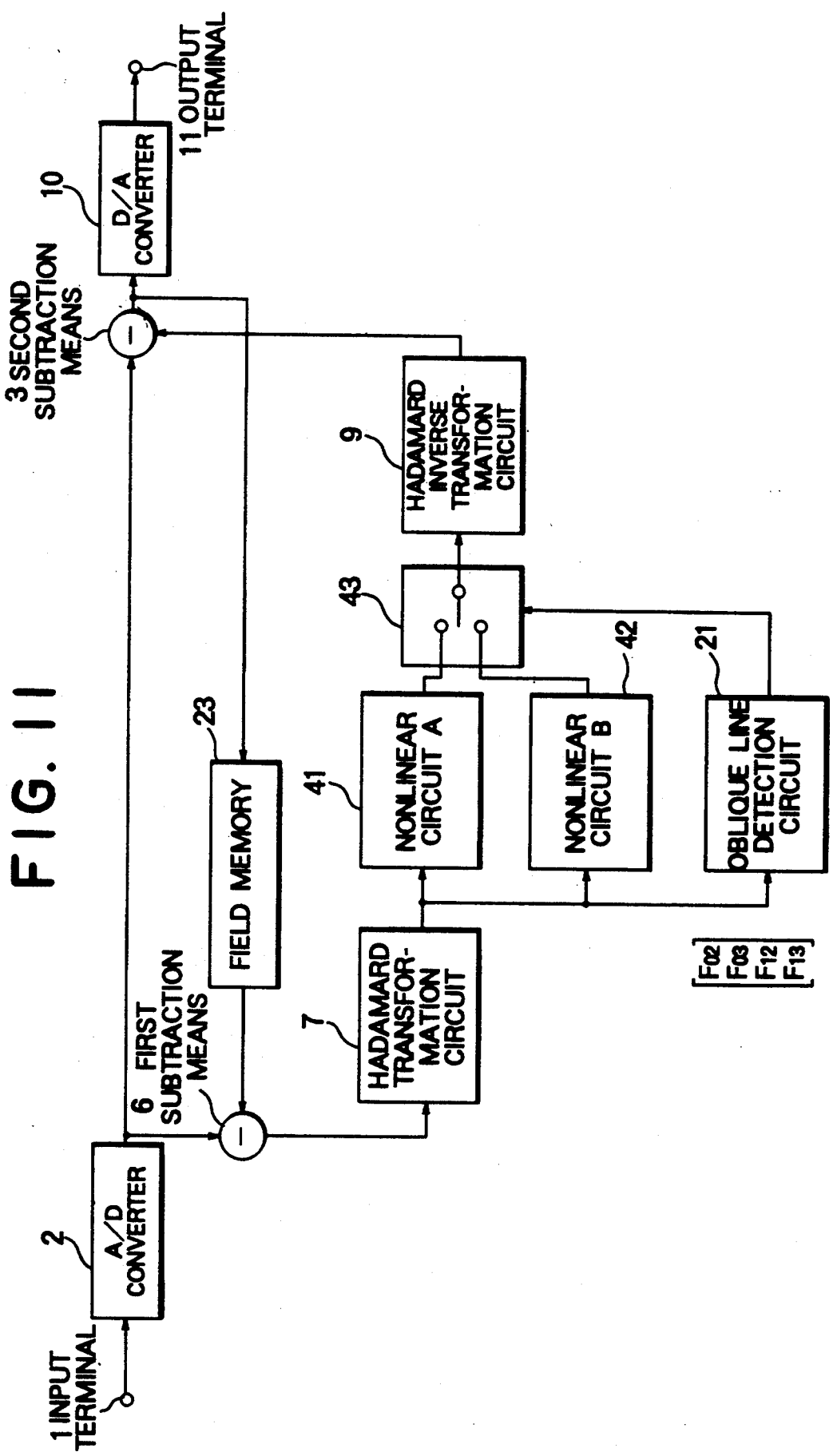
FIG. 11 is a block diagram schematically illustrating a noise reduction apparatus according to a second embodiment of the present invention.

FIG. 11 is a block diagram of a noise reduction apparatus according to the second embodiment of the present invention. In FIG. 11, elements designated by numerals 1, 2, 3, 6, 7, 10, 11, 21 and 23 are the same as those of FIG. 1 and have the same function. Numeral 9 denotes an Hadamard inverse transformation circuit, 41 a nonlinear processing circuit A, 42 a nonlinear processing circuit B, 43 a selection circuit for selecting one of output signals of the nonlinear processing circuits 41 and 42.

Operation of the noise reduction apparatus of the second embodiment configured above is now described. However, portions performing the same operation as that of the first embodiment are omitted.

The first subtraction means 6 calculates a difference of the input video signal and a one-field delayed video signal and an output of the first subtraction means 6 is supplied to the Hadamard transformation circuit 7. The Hadamard transformation circuit 7 divides the field difference into eight two-dimensional frequency components such as a low-frequency component, a vertical high-frequency component, a horizontal high-frequency component and the like.

Figure 12B:
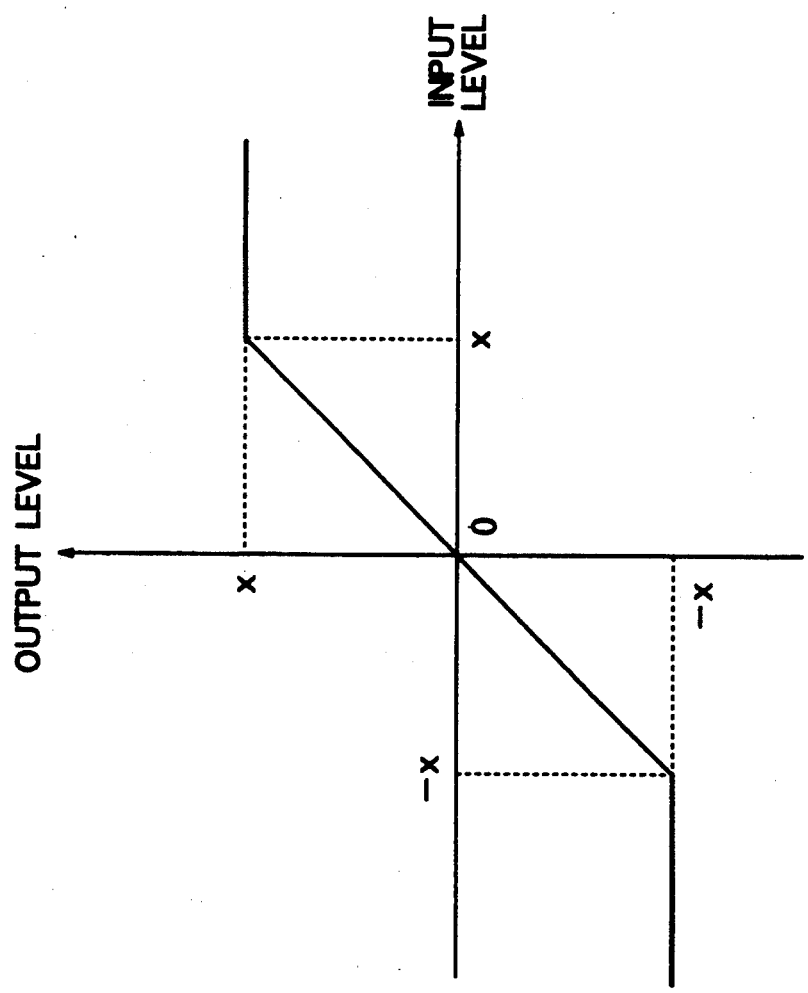

The two different nonlinear circuits 41 and 42 take out noise from the frequency components. More particularly, the nonlinear circuit 41 has an input/output characteristic of FIG. 12A and the nonlinear circuit 42 has an input/output characteristic of FIG. 12B. In this embodiment, x in FIG. 12A and y in FIG. 12B have a relation of $y \leq x$. The characteristic of the nonlinear circuit shown in FIG. 12A is to obtain an improved large S/N and the characteristic shown in FIG. 12B is to reduce the feedback rate in the boundary of an oblique line in which deterioration in a static image tends to be striking.

On the other hand, output signals $F_{02}$, $F_{03}$, $F_{12}$ and $F_{13}$ of the Hadamard transformation circuit 7 are supplied to the oblique line detection circuit 21, which judges whether the boundary of oblique line is contained in the input block of the Hadamard transformation circuit 7 or not from the four components. Operation and its principle of the oblique line detection circuit 21 are the same as described in the first embodiment and the circuit 21 produces a detection signal when the circuit detects the oblique line.

The selection circuit 43 responds to a detection output signal of the oblique line detection circuit 21 and selects the output signal of the nonlinear processing circuit 42 when the oblique line is detected, otherwise the selection circuit selects the nonlinear processing circuit 41. In this manner, the existence of the boundary of an oblique line is detected and the feedback rate in the detected location is reduced to thereby suppress deterioration of the output image.

The output signal of the selection circuit 43 is supplied to the Hadamard inverse transformation circuit 9 to be returned to noise in the time domain. The subtraction circuit 3 subtracts the noise from the input signal to thereby obtain the video signal having reduced noise.

A third embodiment of the present invention is now described with reference to the drawings.

Figure 13:
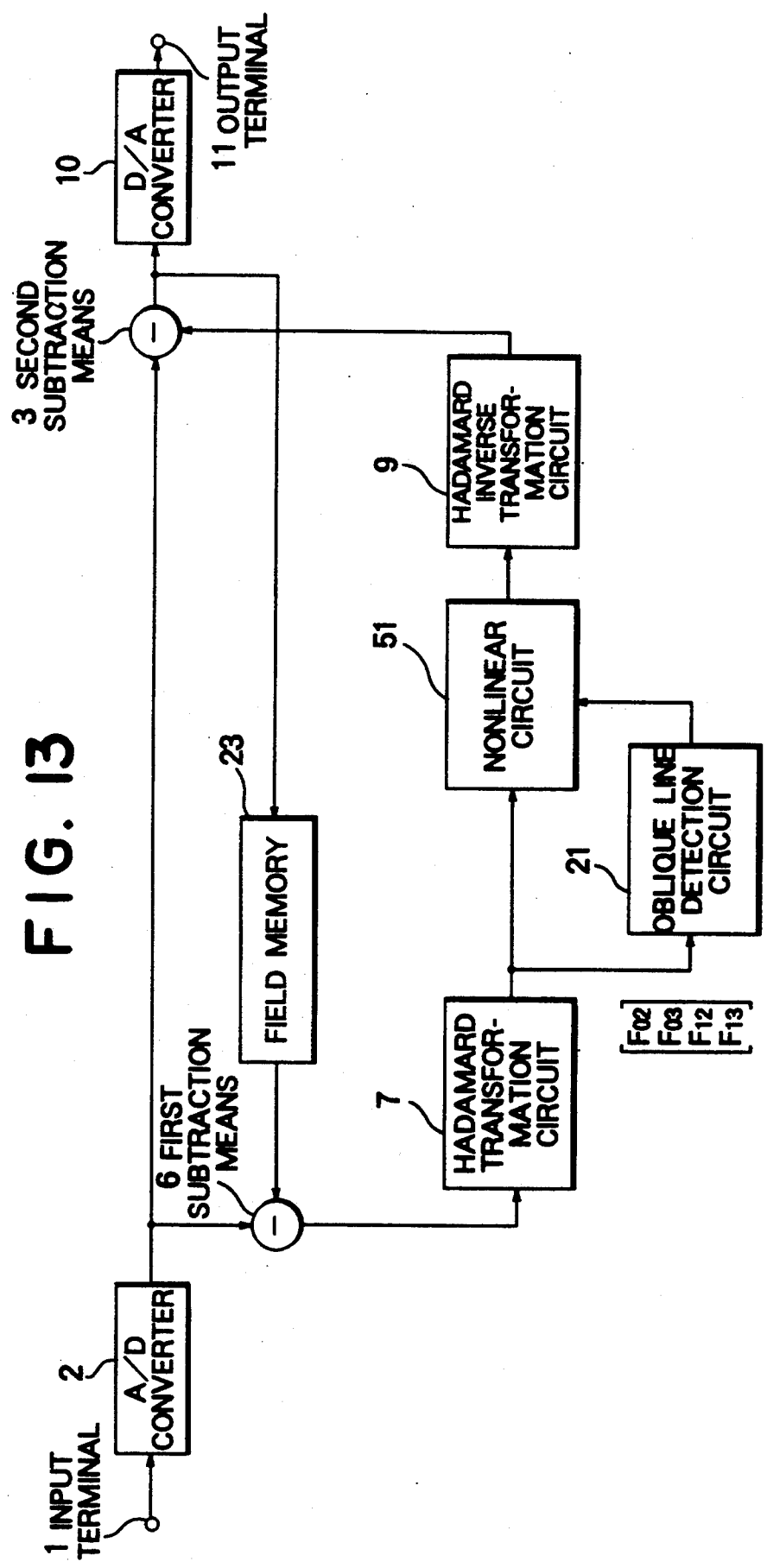
FIG. 13 is a block diagram schematically illustrating a noise reduction apparatus according to a third embodiment of the present invention.

FIG. 13 is a block diagram of a noise reduction apparatus according to the third embodiment of the present invention. In FIG. 13, elements designated by numerals 1, 2, 3, 6, 7, 9, 10, 11, 21 and 23 are the same as those of FIG. 11 and have the same function.

Figure 14:
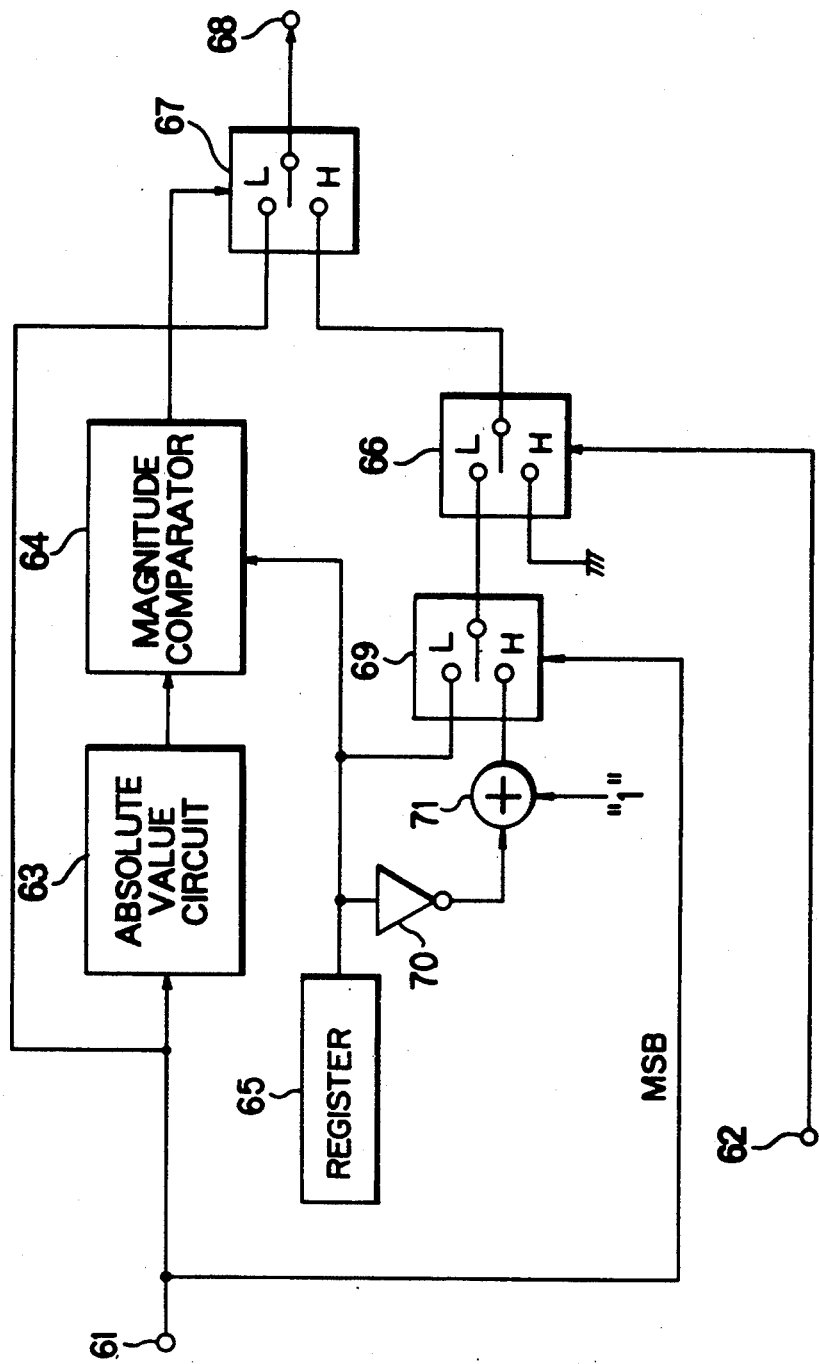
FIG. 14 is a block diagram schematically illustrating an internal configuration of a nonlinear circuit 51 in the third embodiment of the present invention.

Numeral 51 denotes a nonlinear circuit capable of changing the nonlinear processing characteristic and an example of a circuit configuration thereof is shown in FIG. 14. In FIG. 14, numeral 61 denotes an input terminal for inputting components, 62 an input terminal for inputting a detection result of an oblique line, 63 an absolute value circuit for obtaining an absolute value of the input signal, 64 a magnitude comparison circuit for comparing magnitudes of two input data, 65 a register for holding a set value, 66 and 67 selection circuits, and 68 an output terminal.

Operation of the noise reduction apparatus of the third embodiment configured above is now described. Portions having the same operation of that of the first and second embodiments are omitted.

Figure 15A:
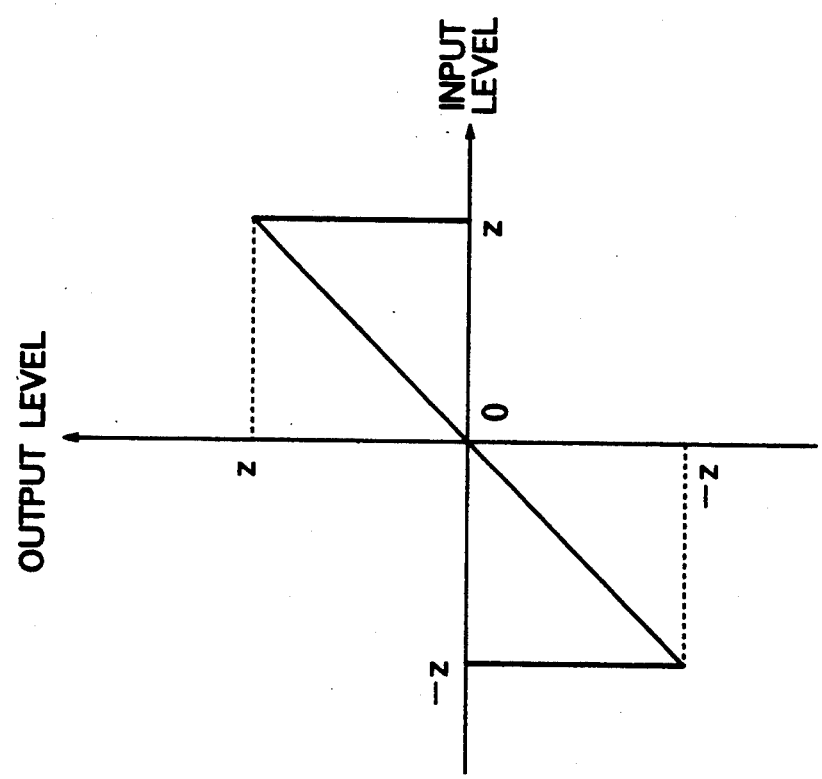
FIGS. 15A and 15B are characteristic diagrams showing input/output characteristics of the nonlinear circuit 51 in the third embodiment of the present invention.
Figure 15B:
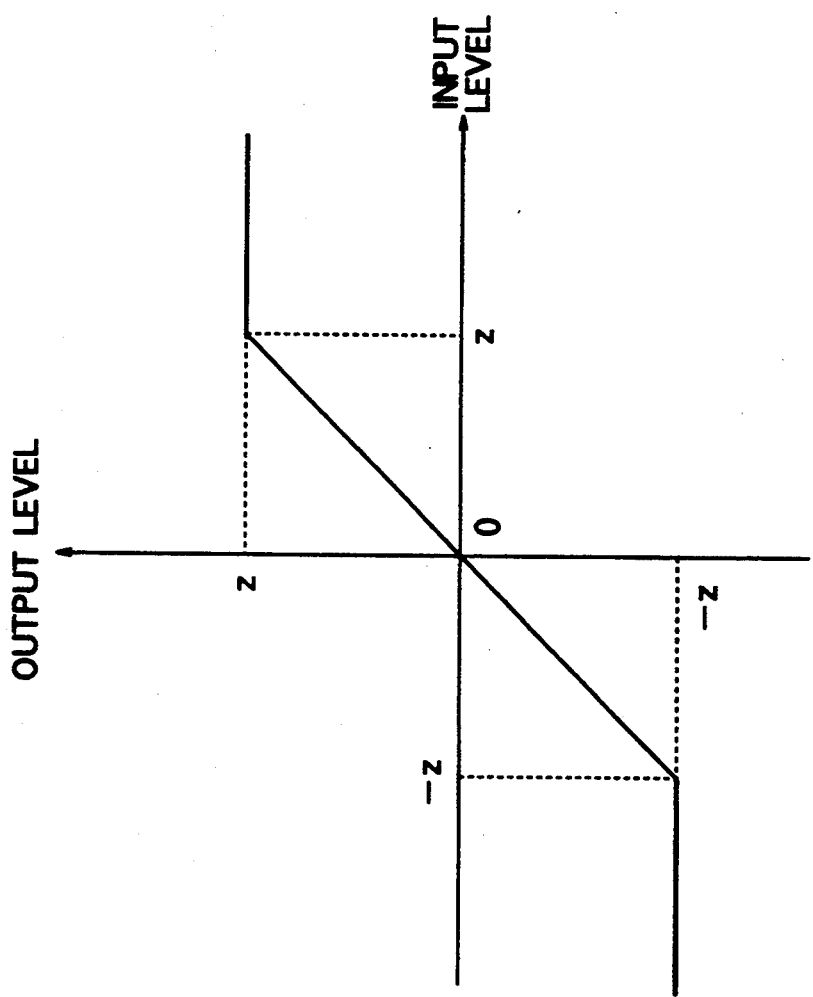

The nonlinear circuit 51 takes out noise from eight two-dimensional frequency components obtained in the Hadamard transformation circuit 7. More particularly, the nonlinear circuit 51 can attain two input/output characteristics of FIGS. 15A and 15B. The nonlinear circuit 51 having the characteristics shown in FIG. 15A is to obtain the improved large S/N and the nonlinear circuit having the characteristics shown in FIG. 15B is to reduce the feedback rate in the boundary of oblique line in which deterioration in a static image tends to be striking.

On the other hand, output signals $F_{02}$, $F_{03}$, $F_{12}$ and $F_{13}$ of the Hadamard transformation circuit are supplied to the oblique line detection circuit 21, which judges whether the boundary of an oblique line is contained in the input block of the Hadamard transformation circuit 7 or not from the four components.

The oblique line detection circuit 21 produces a detection signal when the circuit detects the oblique line. The nonlinear circuit 51 responds to an output signal of the oblique line detection circuit 21 and selects the process of FIG. 15B when the oblique line is detected, otherwise the circuit selects the process of FIG. 15A.

In this manner, when the existence of the boundary of oblique line is detected, the nonlinear processing circuit changes its nonlinear processing characteristics and the feedback rate in the detected location is controlled to be small to thereby suppress deterioration of the image quality.

The output signal of the nonlinear circuit 51 is supplied to the Hadamard inverse transformation circuit 9 to be returned to noise in the time domain and is supplied to the subtraction circuit 3. The subtraction circuit 3 subtracts the noise from the input signal to thereby obtain the video signal having reduced noise.

Operation of the nonlinear circuit 51 is now described. FIG. 14 schematically illustrates an example of an actual circuit configuration of the nonlinear circuit 51. The register 65 holds a value of z of FIGS. 15A and 15B. The selector circuit 66 outputs a ground level (that is, 0 level) when the oblique line detection result is "H", otherwise it outputs an output signal of the selector circuit 69. The selector circuit 69 outputs a value held in the register 65 when an input signal given to the input terminal 61 is positive or zero, that is, a most significant bit (MSB) of the input signal is "L", otherwise it outputs a value obtained by the NOT gate 70 and the adder 71 which increases a value of an output signal of the NOT gate by 1 so as to produce a signal having the same absolute value as the value held in the register 65 and a different sign from it. On the other hand, when the frequency components are supplied from the input terminal 61, absolute values thereof are obtained in the absolute value circuit 63 and the absolute values are compared with the value held in the register in the magnitude comparator 64. Only when the output of the absolute value circuit 63 is larger than the value of the register, the comparator 64 produces an "H" output signal. The selector circuit 67 selects an output value of the selector circuit 66 when the output of the comparator 64 is "H", otherwise it produces the inputted component as it is.

In the above operation, the nonlinear circuit 51 can perform the two nonlinear processes shown in FIG. 15 only by holding the value by the register and obtaining the result of the oblique line detection circuit.

In the third embodiment, one nonlinear circuit is used to perform the two nonlinear processes, so that the circuit configuration is simplified. Since the two nonlinear processes are performed by one circuit configuration it is impossible to attain quite different nonlinear processes but it is sufficient to attain the object of the noise reduction apparatus.

As described above, according to the present invention, there can be realized a noise reduction apparatus in which the existence of the boundary of an oblique line is detected from the components obtained by the Hadamard transformation and the nonlinear processing characteristics are changed by the detected result, so that deterioration of the image quality can be suppressed by reduction of the feedback rate in the boundary of an oblique line in which deterioration tends to be striking and the S/N can be improved by increase of the feedback rate in other locations to thereby attain excellent effect in improvement of the S/N as compared with the conventional field recursive type noise reduction apparatus.

We claim:

1. A noise reduction apparatus for reducing noise components included in an input video signal, said apparatus comprising:
   delay means, including a field memory, for receiving a second difference signal and delaying said second difference signal for a period of one field;
   first subtraction means, receiving said input video signal, for calculating a difference component of the input video signal and an output signal of said delay means and outputting a first difference signal in response thereto;
   feature extraction means for decomposing said first difference signal of said first subtraction means into a plurality of feature components by performing Hadamard transformation;
   oblique line detection means, receiving at least four of said plurality of feature components, for detecting a boundary of an oblique line included in a picture image represented by said input video signal and outputting a detection signal;
   nonlinear processing means for performing nonlinear processing on the first difference signal of said first subtraction means in accordance with the detection signal; and
   second subtraction means for calculating said second difference signal between an output signal of said nonlinear processing means and the input video signal, and supplying said second difference signal to said delay means and outputting said second difference signal as an output signal of said apparatus.

2. A noise reduction apparatus according to claim 1, wherein said input video signal is a luminance signal.

3. A noise reduction apparatus according to claim 1, wherein
   said feature extraction means performs 2 (vertical)×4 (horizontal) order Hadamard transformation to output, as said plurality of feature components, eight frequency components $F_1$-$F_8$ having respective horizontal frequencies $f_1$-$f_8$, where $f_1$, $f_2 > f_3 = f_4 > f_5 = f_7$, $f_8$, and said oblique line detection means is supplied with four frequency components $F_3$, $F_4$, $F_5$ and $F_6$ respectively, and outputs the detection signal in response to at least any one of (a) a first condition that a sign of $F_3$ is different from a sign of $F_4$ and an absolute value of $F_3$ is larger than a first predetermined value, and (b) a second condition that a sign of $F_5$ is different from a sign of $F_6$ and an absolute value of $F_5$ is larger than a second predetermined value.

4. A noise reduction apparatus according to claim 1, wherein:
   said feature extraction means performs 2 (vertical)×4 (horizontal) order Hadamard transformation to output, as said plurality of feature components, eight frequency components $F_1$-$F_8$ having respective horizontal frequencies $f_1$-$f_8$, where $f_1$, $f_2 > f_3 = f_4 > f_5 = f_6 > f_7$, $f_8$; and
   said oblique line detection means is supplied with four frequency components $F_3$, $F_4$, $F_5$ and $F_6$ respectively, and outputs the detection signal in response to at least one of (a) a first condition that a sign of $F_3$ is different from a sign of $F_4$ and an absolute value of $F_3$ is larger than a first predetermined value, (b) a second condition that a sign of $F_3$ is different from a sign of $F_4$ and an absolute value of $F_4$ is larger than a second predetermined value, (c) a third condition that a sign of $F_5$ is different from a sign of $F_6$ and an absolute value of $F_4$ is larger than a third predetermined value, and (d) a fourth condition that a sign of $F_5$ is different from a sign of $F_6$ and an absolute value of $F_6$ is larger than a fourth predetermined value.

5. A noise reduction apparatus for reducing noise components included in an input video signal, said apparatus comprising:
   delay means, including a field memory, for receiving a second difference signal and delaying said second difference signal for a period of one field;

first subtraction means, receiving said input video signal, for calculating a difference component of the input video signal and an output signal of said delay means and outputting a first difference signal in response thereto;

feature extraction means for decomposing said first difference signal of said first subtraction means into a plurality of feature components by performing Hadamard transformation;

oblique line detection means, receiving at least four of said plurality of feature components, for detecting a boundary of an oblique line included in a picture image represented by the input video signal and outputting a detection signal;

nonlinear processing means for receiving said plurality of feature components and performing nonlinear processing on at least one of said plurality of feature components in accordance with the detection signal;

inverse transformation means for performing a transformation, which is inverse to said Hadamard transformation, on said plurality of feature components output from said nonlinear processing means and second subtraction means for calculating said second difference signal between an output signal of said inverse transformation means and the input video signal, and supplying said second difference signal to said delay means, and outputting said second difference signal as an output signal of said apparatus.

6. A noise reduction apparatus according to claim 5, wherein said input video signal is a luminance signal.

7. A noise reduction apparatus according to claim 5, wherein:

said feature extraction means performs 2 (vertical)×4 (horizontal) order Hadamard transformation to output, as said plurality of feature components, eight frequency components $F_1$-$F_8$ having respective horizontal frequencies $f_1$-$f_8$, where $f_1$, $f_2 > f_3 = f_4 > f_5 = f_7$, $f_8$; and said oblique line detection means is supplied with four frequency components $F_3$, $F_4$, $F_5$ and $F_6$ respectively, and outputs the detection signal in response to at least any one of (a) a first condition that a sign of $F_3$ is different from a sign of $F_4$ and an absolute value of $F_3$ is larger than a first predetermined value, and (b) a second condition that a sign of $F_5$ is different from a sign of $F_6$ and an absolute value of $F_5$ is larger than a second predetermined value.

8. A noise reduction apparatus according to claim 5, wherein:

said feature extraction means performs 2 (vertical)×4 (horizontal) order Hadamard transformation to output, as said plurality of feature components, eight frequency components $F_1$-$F_8$ having respective horizontal frequencies $f_1$-$f_8$, where $f_1$, $f_2 > f_3 = f_4 > f_5 = f_6 > f_7$, $f_8$; and said oblique line detection means is supplied with four frequency components $F_3$, $F_4$, $F_5$ and $F_6$ respectively, and outputs the detection signal in response to at least one of (a) a first condition that a sign of $F_3$ is different from a sign of $F_4$ and an absolute value of $F_3$ is larger than a first predetermined value, (b) a second condition that a sign of $F_3$ is different from a sign of $F_4$ and an absolute value of $F_4$ is larger than a second predetermined value, (c) a third condition that a sign of $F_5$ is different from a sign of $F_6$ and an absolute value of $F_4$ is larger than a third predetermined value, and (d) a fourth condition that a sign of $F_5$ is different from a sign of $F_6$ and an absolute value of $F_6$ is larger than a fourth predetermined value.

9. A noise reduction apparatus for reducing noise components included in an input video signal, said apparatus comprising:

delay means, including a field memory, for receiving a second difference signal and delaying said second difference signal for a period of one field;

first subtraction means, receiving said input video signal, for calculating a difference component of the input video signal and an output signal of said delay means, and outputting a first difference signal in response thereto;

feature extraction means for decomposing said first difference signal of said first subtraction means into a plurality of feature components by performing Hadamard transformation;

oblique line detection means, receiving at least four of said plurality of feature components, for detecting a boundary of an oblique line included in a picture image represented by the input video signal and outputting a detection signal;

first nonlinear processing means for receiving said plurality of feature components and performing first nonlinear processing on at least one of said plurality of feature components;

second nonlinear processing means for receiving said plurality of feature components and performing second nonlinear processing, which is different from said first nonlinear processing, on at least one of said plurality of feature components;

selection means for selecting one of (i) an output signal of said first nonlinear processing means and (ii) an output signal of said second nonlinear processing means in accordance with the detection signal;

inverse transformation means for performing a transformation, which is inverse to said Hadamard transformation, on said plurality of feature components output from said selection means; and second subtraction means for calculating said second difference signal between an output signal of said inverse transformation means and the input video signal, and supplying said second difference signal to said delay means and outputting said second difference signal as an output signal of said apparatus.

10. A noise reduction apparatus according to claim 9, wherein said input video signal is a luminance signal.

11. A noise reduction apparatus according to claim 9, wherein;

said feature extraction means performs 2 (vertical)×4 (horizontal) order Hadamard transformation to output, as said plurality of feature components, eight frequency components $F_1$-$F_8$ having respective horizontal frequencies $f_1$-$f_8$, where $f_1$, $f_2 > f_3 = f_4 > f_5 = f_7$, $f_8$; and said oblique line detection means is supplied with four frequency components $F_3$, $F_4$, $F_5$ and $F_6$ respectively, and outputs the detection signal in response to at least any one of (a) a first condition that a sign of $F_3$ is different from a sign of $F_4$ and an absolute value of $F_3$ is larger than a first predetermined value, and (b) a second condition that a sign of $F_5$ is different from a sign of $F_6$ and an absolute value of $F_5$ is larger than a second predetermined value.

12. A noise reduction apparatus according to claim 9, wherein:

said feature extraction means performs 2 (vertical)×4 (horizontal) order Hadamard transformation to output, as said plurality of feature components, eight frequency components $F_1$–$F_8$ having respective horizontal frequencies $f_1$–$f_8$, where $f_1$, $f_2 > f_3 = f_4 > f_5 = f_6 > f_7$, $f_8$; and said oblique line detection means is supplied with four frequency components $F_3$, $F_4$, $F_5$ and $F_6$ respectively, and outputs the detection signal in response to at least one of (a) a first condition that a sign of $F_3$ is different from a sign of $F_4$ and an absolute value of $F_3$ is larger than a first predetermined value, (b) a second condition that a sign of $F_3$ is different from a sign of $F_4$ and an absolute value of $F_4$ is larger than a second predetermined value, (c) a third condition that a sign of $F_5$ is different from a sign of $F_6$ and an absolute value of $F_4$ is larger than a third predetermined value, and (d) a fourth condition that a sign of $F_5$ is different from a sign of $F_6$ and an absolute value of $F_6$ is larger than a fourth predetermined value.

* * * * *